(12) United States Patent
Waku et al.

(10) Patent No.: US 8,537,055 B2
(45) Date of Patent: Sep. 17, 2013

(54) PORTABLE ELECTRONIC DEVICE AND MAGNETIC ANTENNA CIRCUIT

(75) Inventors: Kenji Waku, Kanagawa (JP); Tadashi Koyama, Kanagawa (JP); Masayuki Saito, Kanagawa (JP); Yasuhiro Katayama, Kanagawa (JP); Katsuji Morishita, Kanagawa (JP); Shinobu Kato, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 994 days.

(21) Appl. No.: 12/528,970

(22) PCT Filed: Feb. 27, 2008

(86) PCT No.: PCT/JP2008/053449
§ 371 (c)(1),
(2), (4) Date: Oct. 28, 2009

(87) PCT Pub. No.: WO2008/105477
PCT Pub. Date: Sep. 4, 2008

(65) Prior Publication Data
US 2010/0103055 A1   Apr. 29, 2010

(30) Foreign Application Priority Data

Feb. 27, 2007 (JP) .................................. 2007-047727
Feb. 27, 2007 (JP) .................................. 2007-047728
Mar. 27, 2007 (JP) .................................. 2007-081083

(51) Int. Cl.
*H01Q 1/24* (2006.01)
(52) U.S. Cl.
USPC ............................ 343/702; 343/850; 343/895

(58) Field of Classification Search
USPC .................................. 343/702, 850, 860, 895
See application file for complete search history.

(56) References Cited

U.S. PATENT DOCUMENTS

| 4,654,668 A | 3/1987 | Schwartz et al. |
| 7,242,356 B2 * | 7/2007 | Lu et al. ........................ 343/702 |

(Continued)

FOREIGN PATENT DOCUMENTS

| JP | 61-230504 | 10/1986 |
| JP | H06-335084 A | 12/1994 |

(Continued)

OTHER PUBLICATIONS

International Search Report, PCT/JP2008/053449, Japanese Patent Office, issued May 13, 2008.

(Continued)

*Primary Examiner* — Tan Ho
(74) *Attorney, Agent, or Firm* — Procopio, Cory, Hargreaves & Savitch LLP

(57) ABSTRACT

A portable electronic device and a magnetic field antenna circuit are provided for making it possible to keep an antenna resonance frequency in a fixed range even if temperature changes. A mobile telephone device (1) is provided with a second communication unit driven by a chargeable battery (43) to execute a predetermined function and an RFID unit (41) accompanied with magnetic communication. The RFID unit (41) includes a magnetic antenna unit (50), which can transmit or receive a wireless signal by a magnetic field, and a capacitor (52), one terminal of which is connected with the magnetic antenna unit (50) to generate a predetermined resonance frequency. The capacitor (52) is characterized in having a temperature-reactance characteristic reverse to an amount of an inductance value that fluctuates as the magnetic antenna unit (50) changes in accordance with temperatures.

16 Claims, 25 Drawing Sheets

(56) References Cited

U.S. PATENT DOCUMENTS

| | | | |
|---|---|---|---|
| 7,701,397 B2 * | 4/2010 | Mori et al. | 343/702 |
| 2002/0044092 A1 * | 4/2002 | Kushihi | 343/702 |
| 2003/0003870 A1 | 1/2003 | Cernusca et al. | |
| 2006/0077107 A1 * | 4/2006 | Kim | 343/702 |

FOREIGN PATENT DOCUMENTS

| | | |
|---|---|---|
| JP | 09-307344 | 11/1997 |
| JP | 10-028013 | 1/1998 |
| JP | 2001-168930 | 6/2001 |
| JP | 2001-344574 | 12/2001 |
| JP | 2004-056413 | 2/2004 |
| JP | 2004-062665 | 2/2004 |
| JP | 2004-514223 | 5/2004 |
| JP | 2004-228797 A | 8/2004 |
| JP | 2005-234827 | 9/2005 |
| JP | 2005-269608 | 9/2005 |
| JP | 2005-318102 A | 11/2005 |
| JP | 2005-339578 | 12/2005 |
| JP | 2005-353066 | 12/2005 |
| JP | 2006-060384 | 3/2006 |
| JP | 2007-104092 | 4/2007 |
| JP | 2007-312276 | 11/2007 |
| WO | 2004-047223 | 6/2004 |
| WO | 2004-070879 | 8/2004 |
| WO | 2006-112410 | 10/2006 |

OTHER PUBLICATIONS

Decision of Rejection dated Jan. 24, 2012, issued in counterpart Japanese Application No. 2009-501286.

* cited by examiner

PORTABLE ELECTRONIC DEVICE AND MAGNETIC ANTENNA CIRCUIT

TECHNICAL FIELD

The present invention relates to a portable electronic device and a magnetic field antenna circuit that perform magnetic field communications.

BACKGROUND ART

Recently, for improved functionality in a portable terminal device that performs remote communications with others, those provided with a means built into a body thereof, for communicating with external devices by way of RFID (Radio Frequency Identification), which is a contactless IC (Integrated Circuit) chip, and the like, are becoming common (see Patent Documents 1 and 2).

Patent Document 1: Japanese Unexamined Patent Application, First Publication No. 2004-62665

Patent Document 2: Japanese Unexamined Patent Application, First Publication No. 2005-339578

Patent Document 3: Japanese Unexamined Patent Application, First Publication No. 2001-344574

DISCLOSURE OF THE INVENTION

Problems to be Solved by the Invention

However, an extraordinarily strict frequency characteristic is required for its antenna performance due to reasons such as important information also being contained within information transmitted and received by RFID communications.

Furthermore, because of its portability, a portable electronic device is used in various operating environments such as a skiing area or a parking lot under extreme heat.

Moreover, not only due to the aforementioned operating environments, but also due to the fact that a portable electronic device is driven by a battery in its design, it is necessary to consider heat arising from the battery itself as well as heat arising from electronic circuits such as a wireless circuit. In addition, in order not to impair portability and design characteristics, the antenna itself cannot be configured to be large, and a coil made by winding up many thin lines is disposed in a constrained state in a small body.

Moreover, since the antenna is susceptible to heat, it is necessary to achieve stable frequency characteristics in such temperature environments in which external and internal temperature differences are large.

Thus, the present invention has been made in view of the aforementioned problems, and provides a portable electronic device including an RFID antenna, which has stable frequency characteristics against temperature change, and which performs adjustment of a resonance frequency for enabling stable communications, and a magnetic field antenna circuit that is used for such a portable electronic device.

Means for Solving the Problems

In order to solve the abovementioned problems, a portable electronic device according to the present invention is characterized by including: a first function unit that is capable of executing a predetermined function with electric power being supplied from a battery; and a second function unit involving magnetic field communications, in which the second function unit has: an antenna coil that is capable of transmitting and receiving wireless signals by a magnetic field; and a reactance adjustment portion that is capable of adjusting a resonance frequency of the antenna coil.

Moreover, in the portable electronic device, the reactance adjustment portion preferably has: a reactance element, an end of which is connected to the antenna coil, and which generates a predetermined resonance frequency; and a temperature-reactance characteristic that is inverse to an inductance characteristic of the antenna coil fluctuating in relation to temperature change.

Furthermore, in the portable electronic device, the first function unit preferably has a first control unit that is capable of executing the predetermined function, and the second function unit preferably has a second control unit that is capable of obtaining data from the wireless signals received by the antenna coil, and transmitting the data to the first control unit.

In addition, in the portable electronic device, a frequency of the wireless signals transmitted and received by the antenna coil is preferably 13.56 MHz.

Moreover, in the portable electronic device, the reactance element preferably has a temperature-reactance characteristic that is inverse to the inductance characteristic of the antenna coil within a predetermined temperature range.

Furthermore, in order to solve the abovementioned problems, a magnetic field antenna circuit according to the present invention is characterized by: being incorporated into a portable electronic device including a first function unit that is capable of executing a predetermined function with electric power being supplied from a battery; and constituting a part of a second function unit involving magnetic field communications, in which the magnetic field antenna circuit includes: an antenna coil that is capable of transmitting and receiving wireless signals by a magnetic field; and a reactance element, an end of which is connected to the antenna coil, the element generating a predetermined resonance frequency, and in which the reactance element has a temperature-reactance characteristic that is inverse to the inductance characteristic of the antenna coil fluctuating in relation to temperature change.

In addition, the portable electronic device is characterized in that: the antenna coil includes an antenna assembly together with other electronic components; the second function unit has a first control unit for obtaining data to be received by the antenna assembly; and the reactance adjustment portion is disposed between the antenna assembly and the first control unit, and changes the resonance frequency of the antenna coil by changing a reactance value.

Moreover, in the portable electronic device, the reactance adjustment portion preferably includes a varicap diode.

Furthermore, the portable electronic device is preferably configured such that the first function unit has a second control unit that is capable of executing the predetermined function, and the first control unit obtains data from a received wave that has been received by the antenna coil, and transmits the obtained data to the second control unit.

In addition, in the portable electronic device, the reactance adjustment portion preferably includes a reactance element and a switching element that is capable of switching of the reactance element between active and inactive, and the switching element is preferably controlled by the second control unit.

Moreover, in the portable electronic device, the switching element is preferably an FET (Field Effect Transistor), to which a bias voltage is applied so that a parasitic diode included in the FET is not rectified.

Furthermore, in the portable electronic device, the reactance adjustment portion preferably includes a plurality of pairs each configured with a reactance element and a switching element that is capable of switching of the reactance element between active and inactive, and the second control unit preferably changes the reactance value by switching each of the plurality of switching elements.

Moreover, it is preferable for the portable electronic device to further include a temperature detecting element, in which the second control unit preferably controls such that the reactance value of the reactance adjustment portion is changed in response to a detected result of the temperature detecting element.

In addition, in the portable electronic device, a frequency of the wireless signals transmitted and received by the antenna coil is preferably 13.56 MHz.

Furthermore, in order to solve the abovementioned problems, a magnetic field antenna circuit according to the present invention is characterized by: being incorporated into a portable electronic device including a first function unit that is capable of executing a predetermined function with electric power being supplied from a battery; and constituting a part of a second function unit involving magnetic field communications, and the magnetic field antenna circuit includes: an antenna coil that is capable of transmitting and receiving wireless signals by a magnetic field; and a reactance adjustment portion, an end of which is connected to the antenna coil, the reactance adjustment portion generating a resonance frequency, in which the reactance adjustment portion is capable of changing a reactance value.

In order to solve the abovementioned problems, a portable electronic device according to the present invention is characterized by including: an antenna that is capable of receiving wireless signals from a magnetic field; a capacitor connected in parallel to one end side of the antenna; a first inductance portion serially connected to another end side of the antenna; a first switch portion, which is connected to one end side of the first inductance portion, the side being the another end side of the antenna, and which switches grounding or ungrounding of the antenna; a second switch portion, which is connected to a side opposite to the antenna of the first inductance portion, and which switches grounding or ungrounding of the first inductance portion; and a control unit for controlling switching operation of the first switch portion and the second switch portion, in which the control unit switches the first switch portion such that the antenna is ungrounded, and switches the second switch portion such that the first inductance portion is grounded, thereby electrically connecting the antenna and the first inductance portion; and the control unit switches the first switch portion such that the antenna is grounded, and switches the second switch portion such that the first inductance portion is ungrounded, thereby electrically disconnecting the antenna and the first inductance portion.

In addition, the mobile terminal device preferably includes: a second inductance portion serially connected to another end side of the first inductance portion; and a third switch portion, which is connected to the second inductance portion, and which switches grounding or ungrounding of the second inductance portion, in which the second inductance portion is preferably configured with n inductance elements (n is a natural number of at least 1), the third switch portion is preferably configured with n switch portions, and the control unit preferably controls switching operation of each switch portion configuring the third switch portion.

EFFECTS OF THE INVENTION

According to the present invention, it is possible to provide stable frequency characteristics in relation to temperature change and the like.

PREFERRED MODE FOR CARRYING OUT THE INVENTION

A description is provided hereinafter regarding embodiments of the present invention.

Figure 1:
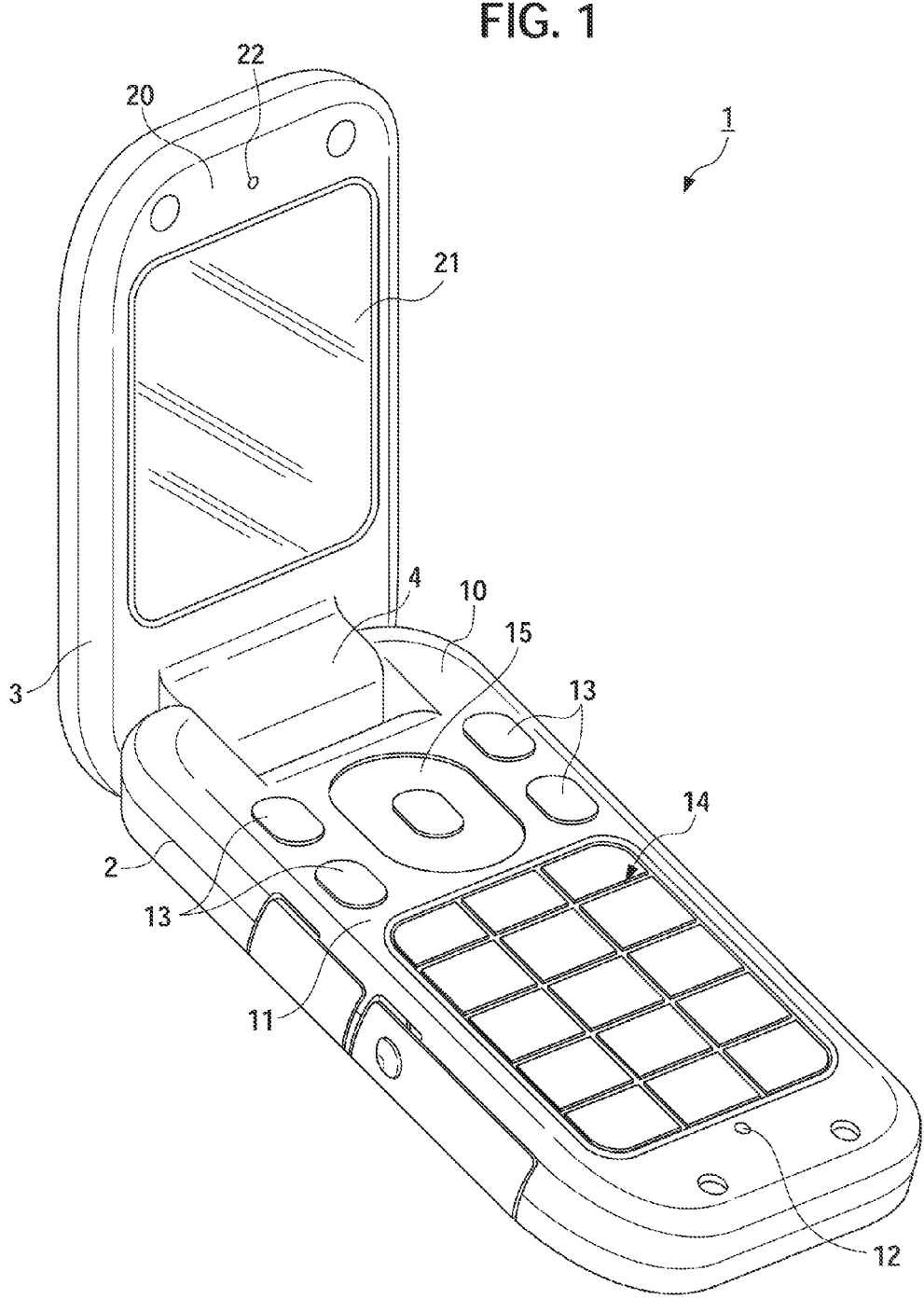
FIG. 1 is a perspective view showing an appearance of a cellular telephone device according to the present invention.

FIG. 1 is a perspective view showing an appearance of a cellular telephone device 1 as an example of the portable electronic device according to the present invention. It should be noted that, although FIG. 1 shows a so-called flip-type cellular telephone device, the present invention is not limited thereto. For example, it may be a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion. Moreover, the portable electronic device of the present invention is not limited to a cellular telephone device, and may be other portable electronic devices such as a PDA (Personal Digital Assistant).

The cellular telephone device 1 is configured to include an operation unit side body 2 and a display unit side body 3. The operation unit side body 2 is configured to include on a front face 10 thereof an operation button set 11 and a sound input unit 12 to which sounds, which a user of the cellular telephone device 1 produces during a phone call, are input. The operation button set 11 includes: feature setting operation buttons 13 for operating various settings and various features such as a telephone number directory feature and a mail feature; input operation buttons 14 for inputting digits of a telephone number and characters for mail, and a selection operation button 15 that performs selection of the various operations and scrolling.

The display unit side body 3 is configured to include, on a front face portion 20, a display 21 for displaying a variety of information, and a sound output unit 22 for outputting sound of the other party of the conversation.

In addition, the abovementioned operation button set 11, the sound input unit 12, the display 21, and the sound output unit 22 compose a processing unit 62 to be described later.

An upper end portion of the operation unit side body 2 and a lower end portion of the display unit side body 3 are connected via a hinge mechanism 4. The cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
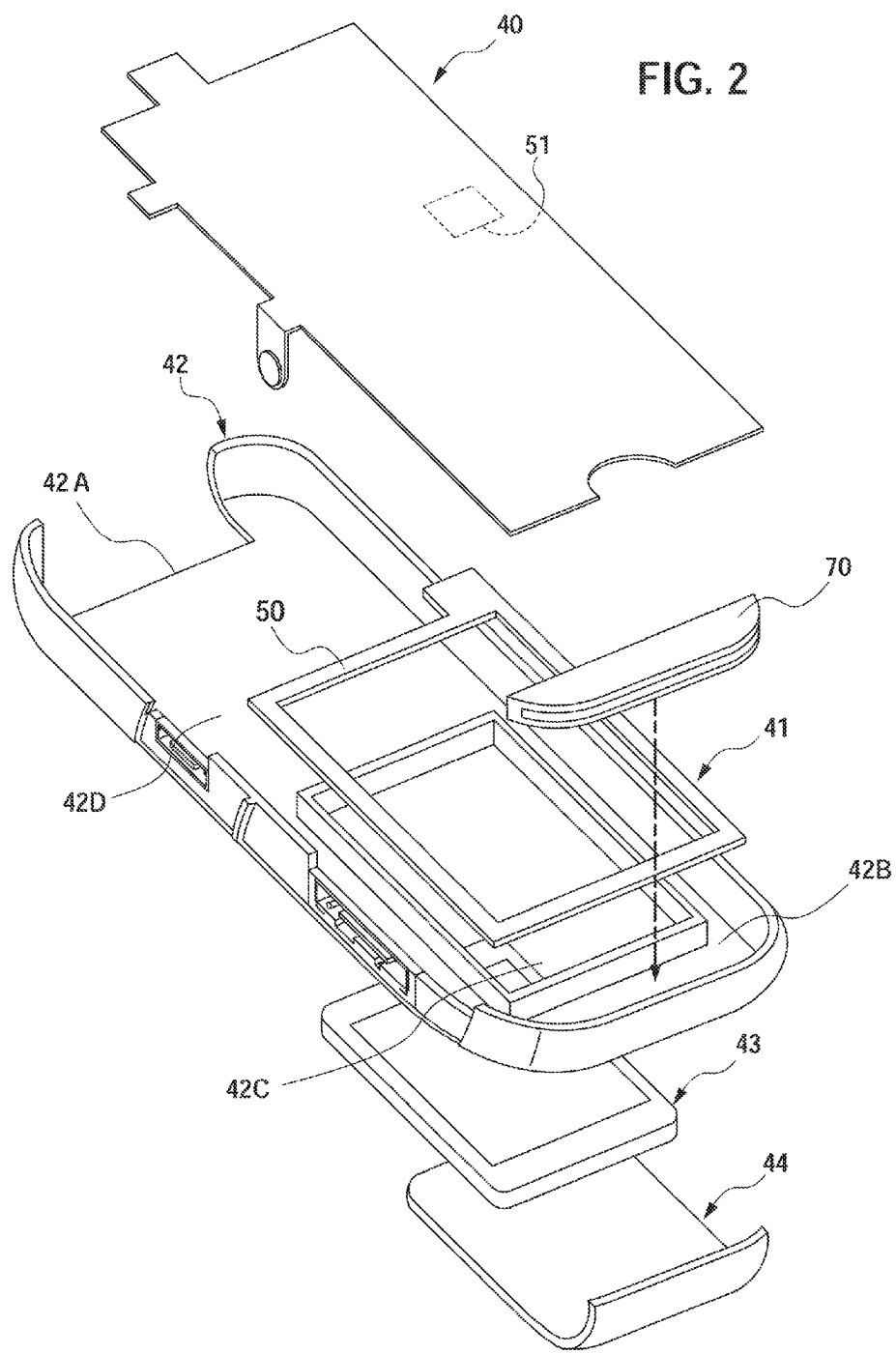
FIG. 2 is a perspective view showing a configuration of an operation unit side body included in the cellular telephone device according to the present invention.

FIG. 2 is an exploded perspective view of a part of the operating unit side body 2. The operating unit side body 2 is composed of a substrate 40, an RFID portion 41, a rear case portion 42, a rechargeable battery 43, and a battery cover 44, as shown in FIG. 2.

On the substrate 40, an element such as a CPU for performing predetermined arithmetic processing is mounted, and a predetermined signal is transmitted thereto when a user operates the operation button set 11 on the front face 10.

Moreover, the RFID portion 41 according to a first embodiment to be described later includes: a magnetic field antenna portion 50 that communicates with external devices by way of a first usable frequency band (for example, 13.56 MHz); an RFID chip 51; and a capacitor 52 for adjustment.

Furthermore, the RFID portion 41 according to a second embodiment to be described later includes: the magnetic field antenna portion 50 that communicates with external devices by way of the first usable frequency band (for example, 13.56 MHz); the RFID chip 51; and a reactance variable portion 57 for adjustment.

In addition, the RFID portion 41 according to a third embodiment to be described later includes: the magnetic field antenna portion 50 that communicates with external devices by way of the first usable frequency band (for example, 13.56 MHz); the RFID chip 51; the capacitor 52; and an inductance portion 58 for adjustment.

The rear case portion 42 includes: a hinge mechanism fixing portion 42A for fixing the hinge mechanism 4; a main antenna housing portion 42B for housing a main antenna 70, which communicates using a second usable frequency band that is higher than the first usable frequency band; a battery housing portion 42C for housing the rechargeable battery 43; and an RFID portion fixing portion 42D for fixing the RFID portion 41. It should be noted that, the main antenna 70 is later described in detail.

FIRST EMBODIMENT

Figure 3:
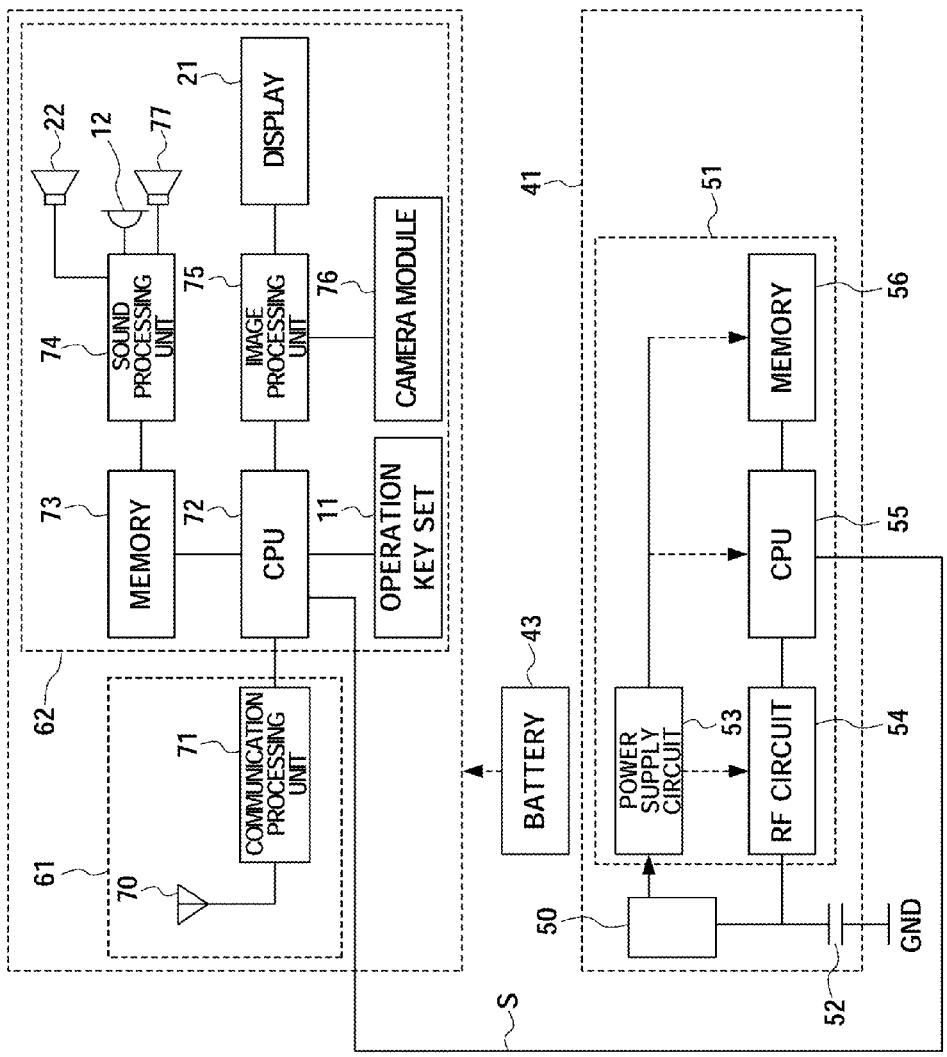
FIG. 3 is a block diagram showing features of the cellular telephone device according to the present invention.

A description is provided hereinafter regarding the first embodiment of the present invention. FIG. 3 is a functional block diagram showing features of the cellular telephone device 1. As shown in FIG. 3, the cellular telephone device 1 includes: the RFID portion 41 (a second function unit) that is a first communication unit; a second communication unit 61 that communicates with external terminals; and a processing unit 62 (a first function unit) that processes information communicated by the second communication unit 61.

As described above, the RFID portion 41 includes: the magnetic field antenna portion 50 that communicates with external devices by way of the first usable frequency band (for example, 13.56 MHz); the RFID chip 51; and the capacitor 52 for adjustment.

The magnetic field antenna portion 50 is a magnetic field antenna configured with a coil wound in a spiral for a plurality of times on a sheet made of PET (polyethylene terephthalate) material, and transmits and receives a signal of the first usable frequency band to and from external devices.

The RFID chip 51 includes: a power circuit 53 that generates a predetermined voltage based on electrical power induced by a signal communicated by the magnetic field antenna portion 50; an RF circuit 54 that performs signal processing such as modulation processing or demodulation processing with respect to a signal communicated by the magnetic field antenna portion 50; a CPU 55 that performs predetermined arithmetic processing; and memory 56 that stores predetermined data. The power circuit 53 is composed of a DC-DC converter, for example.

Here, behavior of the RFID portion 41 is described hereinafter.

The magnetic field antenna portion 50, when approaching within a predetermined distance to a reading/writing device disposed outside thereof, receives electromagnetic waves transmitted from the reading/writing device (modulated by a carrier frequency having the first usable frequency band (for example, 13.56 MHz)). It should be noted that, the capacitor 52 makes a predetermined adjustment (tuning) so that the electromagnetic waves of the first usable frequency band is supplied to the RF circuit 54 via the magnetic field antenna portion 50.

In addition, electromotive force is generated by an electromagnetic induction effect when the electromagnetic waves are received by the magnetic field antenna portion 50.

The power circuit 53 generates a predetermined power supply voltage from the electromotive force generated by the electromagnetic induction effect, and supplies the power supply voltage to the RF circuit 54, the CPU 55, and the memory 56. In addition, the RF circuit 54, the CPU 55, and the memory 56 are switched from a halt state to an active state when the predetermined power supply voltage is supplied from the power circuit 53.

The RF circuit 54 performs signal processing such as demodulation with respect to a signal of the first usable frequency band received via the magnetic field antenna portion 50, and transmits the processed signal to the CPU 55.

The CPU 55 writes or reads data to or from the memory 56, based on the signal received from the RF circuit 54. In a case of reading data from the memory 56, the CPU 55 transmits the data to the RF circuit 54. The RF circuit 54 performs signal processing such as modulation with respect to the data being read from the memory 56, and transmits the data to the external reading/writing device via the magnetic field antenna portion 50.

It should be noted that the RFID portion 41 is described above to be of a so-called passive, induction field type (electromagnetic induction type) without a power source; however, the present invention is not limited thereto, and the RFID portion 41 can also be of a passive mutual induction type (electromagnetic coupling type) or a passive radiation field type (radio wave type), or an active type with a power source. In addition, an access method of the RFID portion 41 is described as a read/write type; however, the present invention is not limited thereto, and the access method can also be of a read-only type, a write-once type, and the like.

As shown in FIG. 3, the second communication unit 61 includes: a main antenna 70 that communicates with external devices by way of the second usable frequency band that is higher than the first usable frequency band; and a communication processing unit 71 (the second information processing unit) that performs signal processing such as modulation processing or demodulation processing. In addition, the second communication unit 61 is powered by the rechargeable battery 43.

The main antenna 70 communicates with external devices by way of the second usable frequency band (for example, 800 MHz). It should be noted that, although the second usable frequency band is described as 800 MHz in the present embodiment, other frequency bands can also be used. In addition, the main antenna 70 can be configured as a so-called dual band compatible antenna that can accept, in addition to the second usable frequency band, a third usable frequency band (for example, 2 GHz), or as a multi-band compatible antenna that can further accept a fourth usable frequency band.

The communication processing unit 71 performs demodulation processing of a signal received by the main antenna 70, transmits the processed signal to the processing unit 62, performs modulation processing of a signal received from the processing unit 62, and submits the processed signal to an external device via the main antenna 70.

As shown in FIG. 3, the processing unit 62 includes: the operation button set 11; the sound input unit 12; the display 21; the sound output unit 22; the CPU 72 that performs predetermined arithmetic processing; the memory 73 that stores predetermined data; a sound processing unit 74 that performs predetermined sound processing; an image processing unit 75 that performs predetermined image processing; a camera module 76 that captures an image of an object; and a speaker 77 that outputs ringtones and the like. In addition, the processing unit 62 is powered by the rechargeable battery 43. As shown in FIG. 3, it should be noted that the cellular telephone device 1 is configured such that: the CPU 55 and the CPU 72 are connected by a signal line S via which information processed by the RFID portion 41 is transmitted to the image processing unit 75; and information processed by the image processing unit 75 is displayed on the display 21.

Next, a description is provided regarding characteristics of the RFID portion 41.

Figure 4:
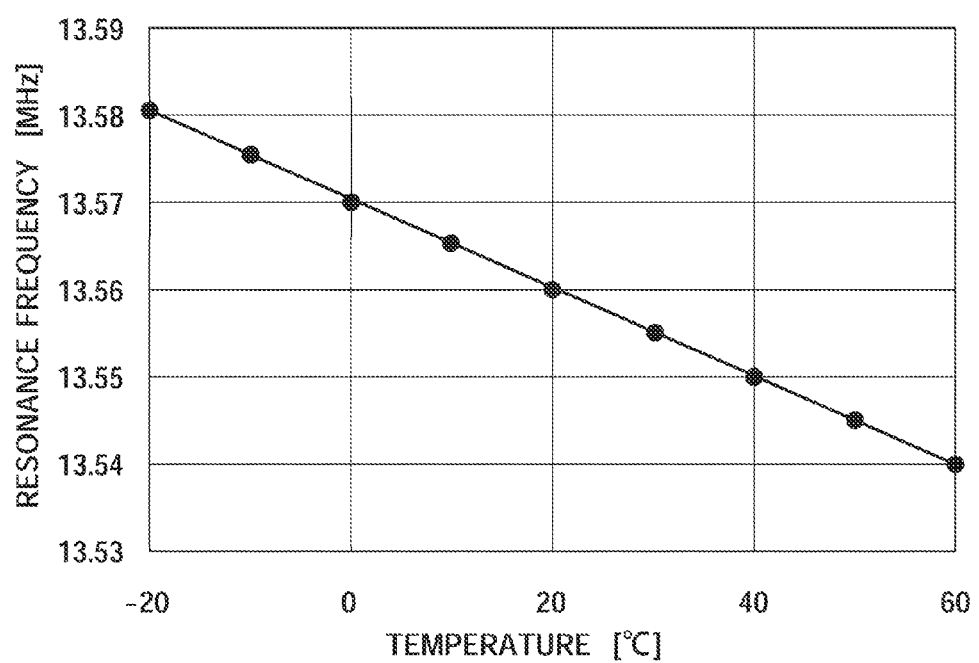
FIG. 4 is a graph showing change in resonance frequency versus temperature change of an RFID portion.

The magnetic field antenna portion 50 configuring the RFID portion 41 has temperature characteristics as shown in FIG. 4, in which the resonance frequency increases as the environmental temperature decreases, and the resonance frequency decreases as the environmental temperature increases. This is caused by a change in inductance (L) value when the antenna wire material configuring the magnetic field antenna portion 50 contracts or expands by environmental temperature change.

Incidentally, an extraordinarily strict frequency characteristic is required for the antenna performance of the RFID portion 41, and it is necessary to configure the resonance frequency (for example, 13.56 MHz) to fall within a certain frequency range (for example, +/−100 kHz) under a general operating environment. It should be noted that, in addition to the aforementioned resonance frequency, there are various resonance frequencies such as 13.1725 MHz+/−200 kHz or 13.61 MHz+/−75 kHz because of reasons such as consideration of influences from the configuration of terminal hardware and the like.

Figure 5:
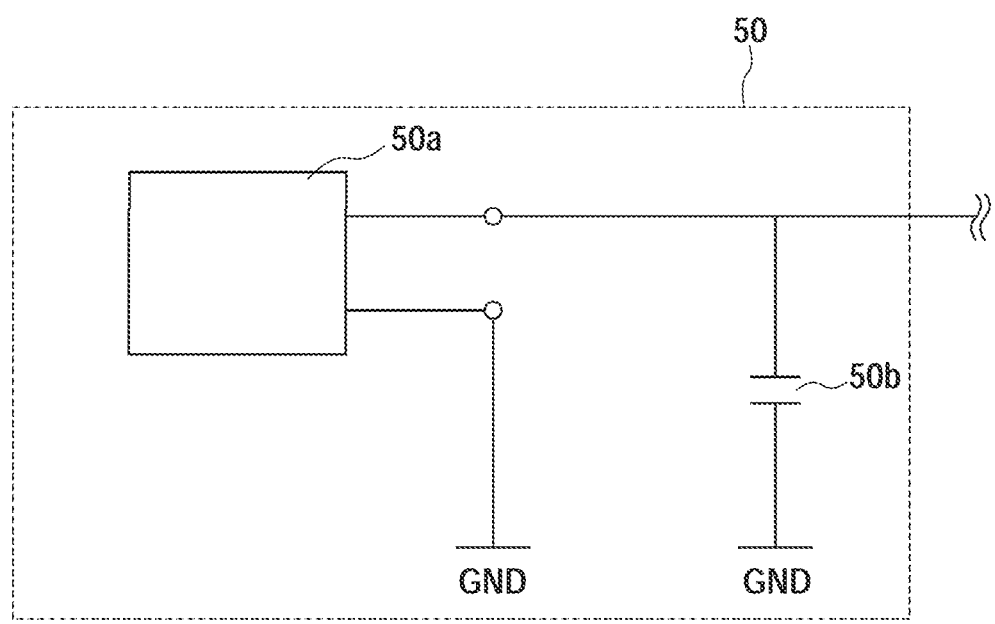
FIG. 5 is a diagram showing a configuration of a magnetic field antenna portion according to the present invention.

Thus, as shown in FIG. 5, in the cellular telephone device 1 according to the present invention, the magnetic field antenna portion 50 (the antenna assembly side) is configured with: a coil 50*a* (magnetic field antenna) wound in a spiral for a plurality of times; and a temperature compensating reactance element 50*b* (for example, a temperature compensating capacitor for −750 ppm/degrees Celsius). This magnetic field antenna portion 50 is electrically connected to the RFID chip 51, and is conductive to a ground portion GND via the capacitor 52.

Here, the reactance element 50b has a temperature-reactance characteristic that is inverse to an amount in which the inductance of the coil 50a configured with an antenna wire material fluctuates in relation to a temperature change.

Figure 6:
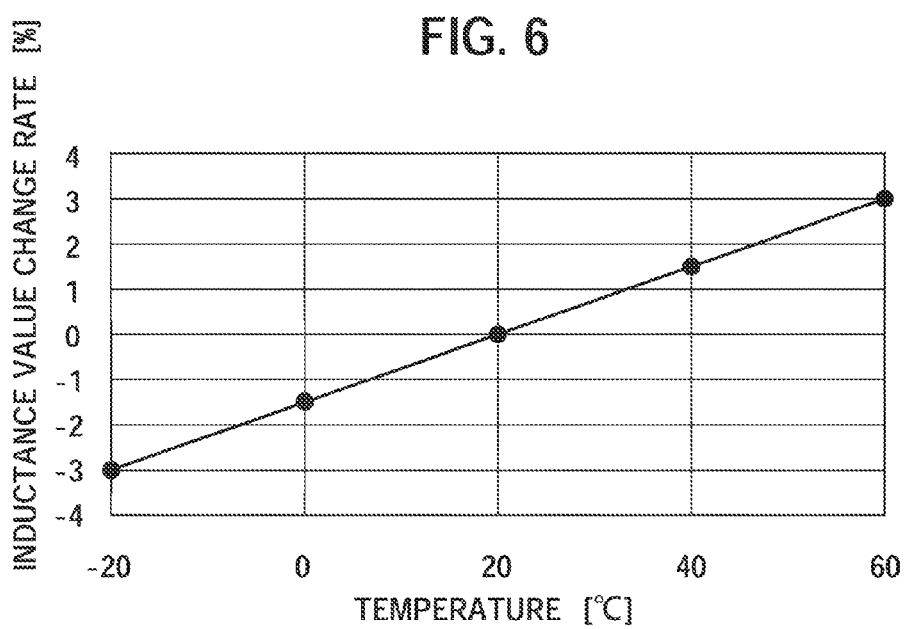
FIG. 6 is a graph showing an inductance value change rate of a coil versus temperature change, the coil configuring the magnetic field antenna portion.
Figure 7:
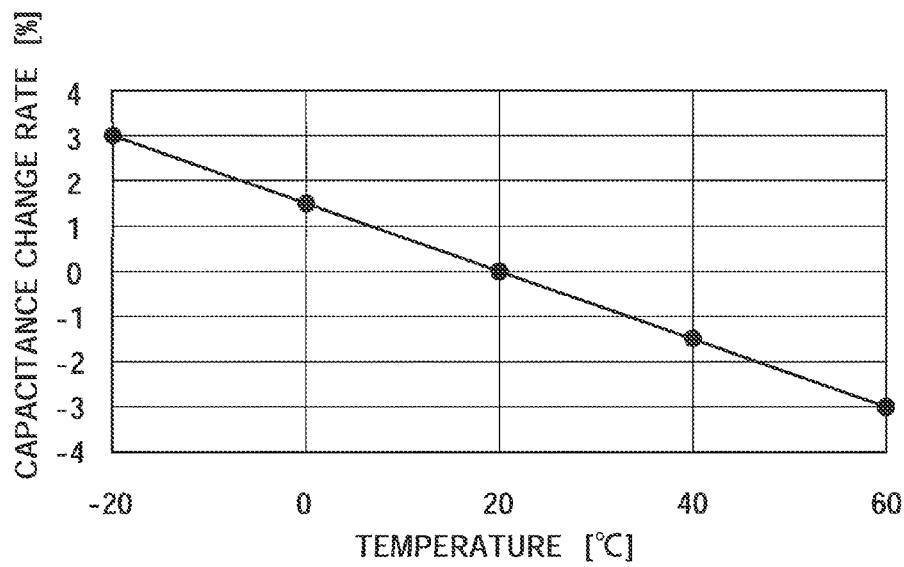
FIG. 7 is a graph showing an inductance value change rate of a reactance element versus temperature change, the reactance element configuring the magnetic field antenna portion.

Therefore, for example, in a case in which the inductance value change rate versus temperature change (from −20 degrees Celsius to +60 degrees Celsius) in the coil 50a has a characteristic as shown in FIG. 6 (for example, relative to 20 degrees Celsius, the inductance value change rate increases as the temperature increases, and the inductance value change rate decreases as the temperature decreases), the reactance element 50b is connected in parallel to the coil 50a, the reactance element 50b having a characteristic in which the capacitance change rate is inverse to the inductance value change rate; that is, for example, relative to 20 degrees Celsius, the capacitance change rate decreases as the temperature increases, and the capacitance change rate increases as the temperature decreases (see FIG. 7).

Figure 8:
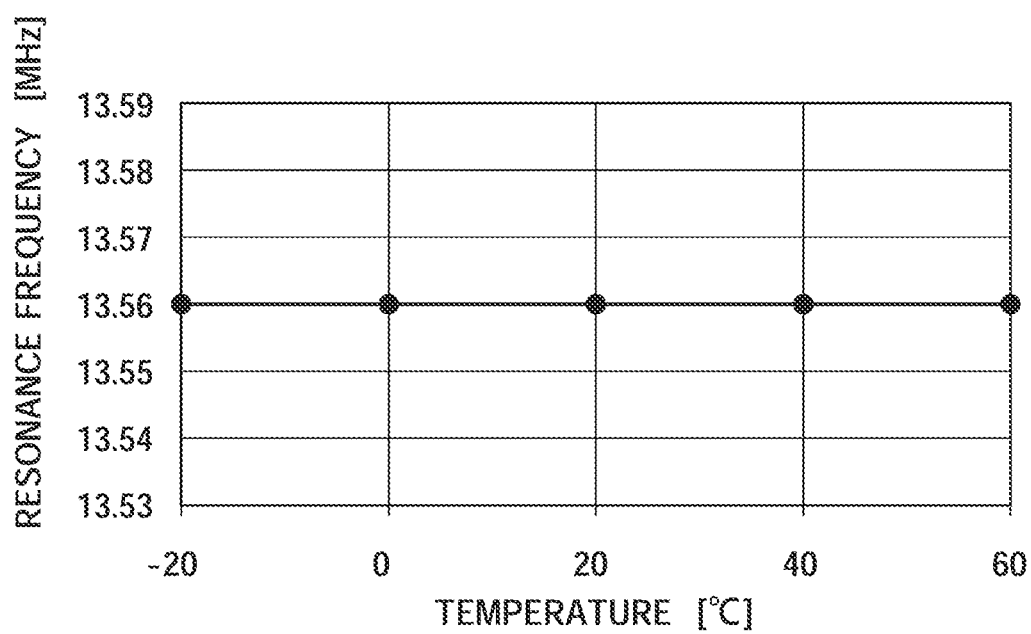
FIG. 8 is a graph showing a characteristic of the resonance frequency versus temperature change of the magnetic field antenna portion.

With such a configuration, as shown in FIG. 8, the magnetic field antenna portion 50 can be configured such that the temperature characteristic of the reactance element 50b cancels the temperature characteristic of the coil 50a, and the resonance frequency does not fluctuate in relation to the temperature change in a predetermined range (from −20 degrees Celsius to +60 degrees Celsius).

Moreover, a resonance frequency Fc of the RFID portion 41 is determined according to an expression (1) by a capacitance value of the capacitor 52 and an inductance value of the magnetic field antenna portion 50 (coil 50a).

$$Fc=1/(2\pi\sqrt{(L*C)}) \tag{1}$$

In this way, according to the present invention, the temperature compensation is performed by loading the reactance element 50b in the magnetic field antenna portion 50 that is the antenna assembly side; and therefore, the reactance value for the entire magnetic field antenna portion 50 does not fluctuate, and the resonance frequency determined by such a magnetic field antenna portion 50 and the capacitor 52 does not fluctuate by the temperature change as well.

Accordingly, since the temperature compensation is performed only in the magnetic field antenna portion 50 that is the antenna assembly side in the cellular telephone device 1 according to the present invention, the countermeasure for temperature compensation becomes unnecessary in configuration portions other than the antenna assembly side. Therefore, whatever configuration the configuration portion may have, compensation is possible without design change of the magnetic field antenna portion 50 that is the antenna assembly side, resulting in versatility of the magnetic field antenna portion 50 that is the antenna assembly side, and leading to cost reduction.

It should be noted that, under the general environment in which the cellular telephone device 1 is used, the resonance frequency (for example, 13.56 MHz) of the RFID portion 41 may be within a certain frequency range (for example, +/−100 kHz), and the capacitance change rate in relation to the temperature of the reactance element 50b does not need to have the characteristic as shown in the aforementioned FIG. 7 (the characteristic that is completely inverse to the inductance value change rate of the coil 50a).

Moreover, as another embodiment, the cellular telephone device 1 may be configured without providing the capacitor 52 such that a resonance frequency is determined by the temperature compensating reactance element 50b and the coil 50a in the magnetic field antenna portion 50 that is the antenna assembly side. Since such a configuration eliminates the need for the capacitor 52, the manufacturing cost of the cellular telephone device 1 can be reduced.

SECOND EMBODIMENT

A description is provided hereinafter regarding the second embodiment of the present invention. Here, the cellular telephone device 1 in the second embodiment is similar in configuration to the cellular telephone device 1 in the first embodiment except for the reactance variable portion 57 for adjustment in the RFID portion 41. A description is provided hereinafter regarding the cellular telephone device 1 in the second embodiment mainly in terms of differences from the cellular telephone device 1 in the first embodiment, and other descriptions are omitted.

Figure 9:
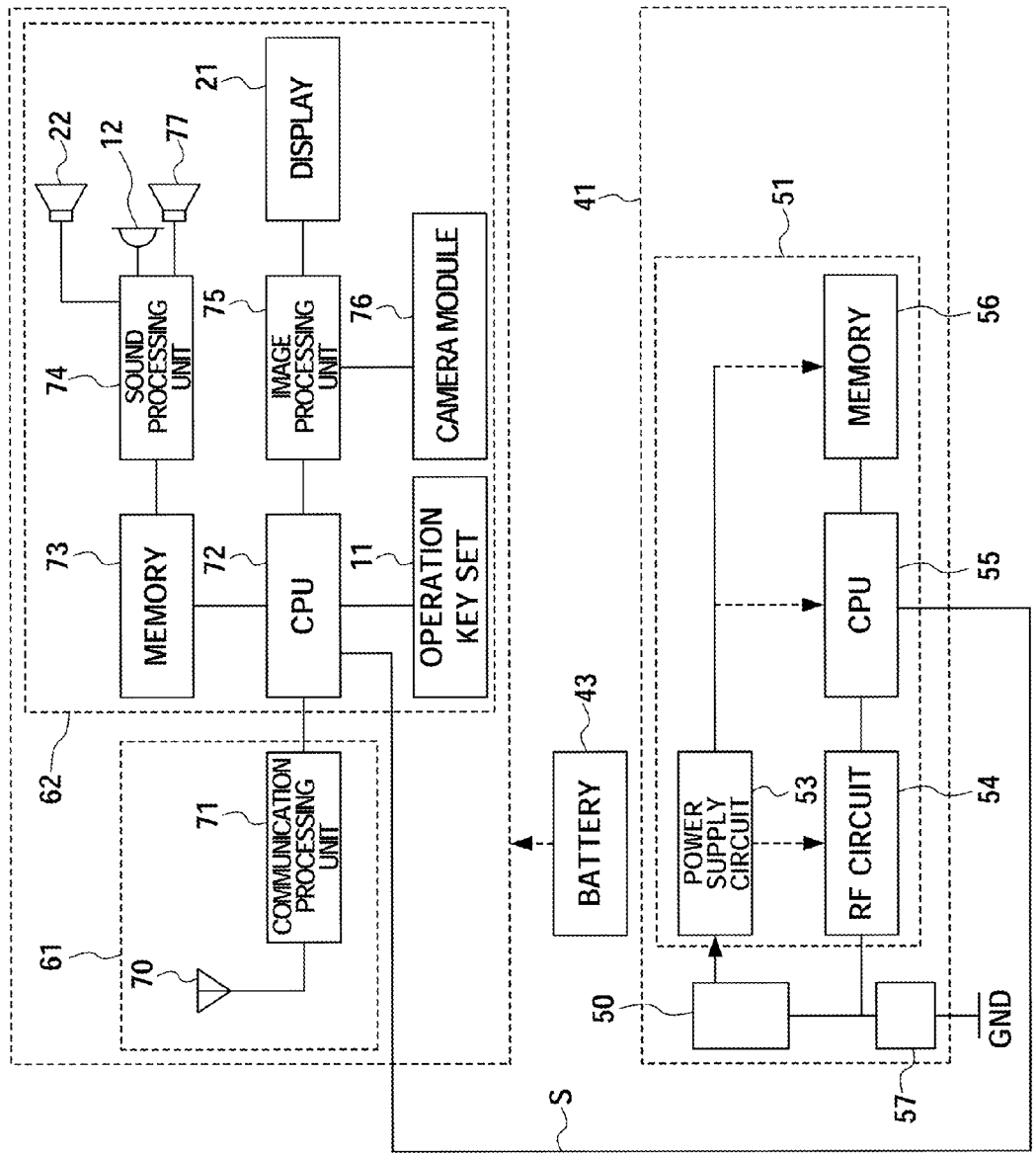
FIG. 9 is a block diagram showing features of the cellular telephone device according to the present invention.

FIG. 9 is a functional block diagram showing features of the cellular telephone device 1. As shown in FIG. 9, the cellular telephone device 1 includes: the RFID portion 41 that is a first communication unit 60; a second communication unit 61 that communicates with external terminals; and a processing unit 62 that processes information communicated by the second communication unit 61.

As described above, the RFID portion 41 includes: the magnetic field antenna portion 50 (a first antenna portion) that communicates with external devices by way of the first usable frequency band (for example, 13.56 MHz); the RFID chip 51 (a first information processing unit); and the reactance variable portion 57 for adjustment.

As shown in FIG. 9, the second communication unit 61 includes: a main antenna 70 (a second antenna portion) that communicates with external devices by way of the second usable frequency band that is higher than the first usable frequency band; and a communication processing unit 71 (a second information processing unit) that performs signal processing such as modulation processing or demodulation processing. In addition, the second communication unit 61 is powered by the rechargeable battery 43.

It should be noted that the behavior and the features of the magnetic field antenna portion 50, the RFID chip 51, the power circuit 53, the RF circuit 54, the CPU 55, the memory 56, the processing unit 62, the main antenna 70, and the communication processing unit 71 are similar to those in the aforementioned first embodiment.

Next, a description is provided regarding characteristics of the RFID portion 41.

An extraordinarily strict frequency characteristic is required for the antenna performance of the RFID portion 41, and it is necessary to configure the resonance frequency (for example, 13.56 MHz) to fall within a certain frequency range (for example, +/−100 kHz) under a general operating environment. It should be noted that, in addition to the aforementioned resonance frequency, there are various resonance frequencies such as 13.1725 MHz+/−200 kHz or 13.61 MHz+/−75 kHz because of reasons such as consideration of influences from the configuration of terminal hardware and the like.

Moreover, a resonance frequency Fc of the RFID portion 41 is determined according to the expression (1) by a capacitance (C) value of the reactance variable portion 57 and an inductance (L) value of the magnetic field antenna portion 50.

$$Fc=1/(2\pi\sqrt{(L*C)}) \tag{1}$$

Here, as for the RFID portion 41, in a case in which the resonance frequency fluctuates due to variations in the inductance (L) value of the magnetic field antenna portion 50, the capacitance of the reactance variable portion 57 for adjustment, the RFID chip 51 and the like, and the variations are great, then the resonance frequency may fall out of specification (a certain frequency range) required for performing stable communications in some cases.

Accordingly, in the cellular telephone device 1 according to the present invention, the resonance frequency is adjusted so as to fall within a certain required range (within the specification) by the following configuration.

First Configuration

Figure 10:
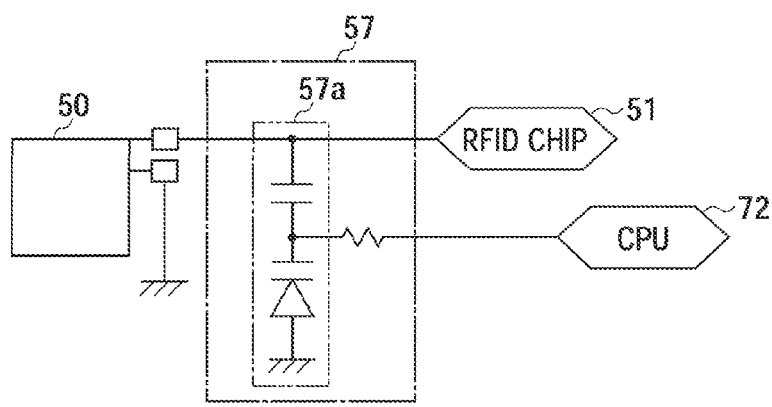
FIG. 10 is a circuit diagram showing a first configuration of the cellular telephone device according to the present invention.
Figure 11:
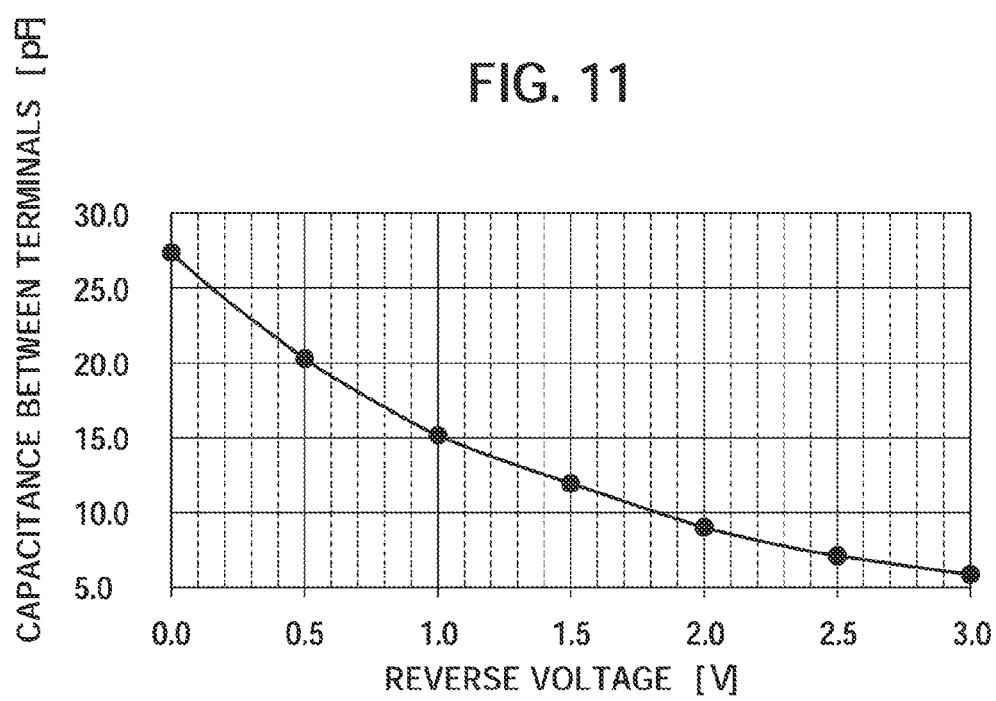
FIG. 11 is a graph showing change in capacitance between terminals versus reverse bias voltage in a varicap diode.

As shown in FIG. 10, the reactance variable portion 57 is configured with a varicap diode 57a, and the varicap diode 57a is connected in parallel to the magnetic field antenna portion 50. The CPU 72 supplies a reverse bias voltage to the varicap diode 57a. Capacitance of the varicap diode 57a varies in response to a voltage value of the reverse bias voltage supplied from the CPU 72. It should be noted that, as shown in FIG. 11, the varicap diode 57a has a characteristic in which capacitance between terminals varies at a predetermined rate in relation to application of the reverse bias voltage.

For example, before factory shipment, confirmation is performed regarding whether the resonance frequency of the RFID portion 41 falls within a predetermined range due to variations in the RFID chip 51 and the like, and a voltage value supplied from the CPU 72 to the varicap diode 57a is determined.

Moreover, after factory shipment, by applying a predetermined reverse bias voltage (for example, +3 V), which has been determined before factory shipment, to the varicap diode 57a from the CPU 72, a stable communication quality is secured in the RFID portion 41 without causing the resonance frequency to fall out of specification due to variations in the terminal capacitance of the RFID chip 51 and the like.

In the cellular telephone device 1 according to the present invention, since a certain reverse bias voltage is supplied from the CPU 72 to the varicap diode 57a, a control voltage port of the CPU 72 can be minimally configured, thereby making it possible to reduce the cost. Moreover, by configuring the resolution of the control voltage at a high level, it is possible to precisely determine the reverse bias voltage applied to the varicap diode 57a, and to control the resonance frequency in a linear manner.

Second Configuration

Figure 12:
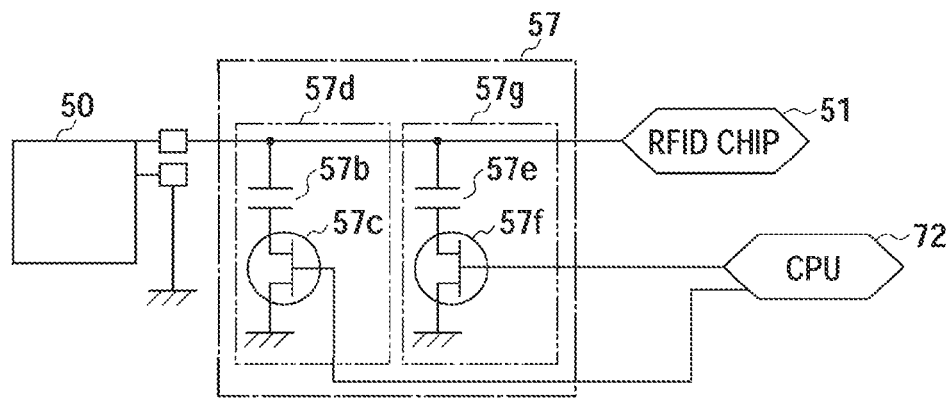
FIG. 12 is a circuit diagram showing a second configuration of the cellular telephone device according to the present invention.

As shown in FIG. 12, the reactance variable portion 57 is configured with: a portion in which a first FET switch portion 57c is serially connected to a capacitor 57b for adjustment (hereinafter referred to as a first adjustment portion 57d); and a portion in which a second FET switch portion 57f is serially connected to a capacitor 57e for adjustment (hereinafter referred to as a second adjustment portion 57g), and each is connected in parallel to the magnetic field antenna portion 50. The CPU 72 selectively supplies a certain voltage to the first FET switch portion 57c and the second FET switch portion 57f, thereby setting them to an ON state or an OFF state. Moreover, by any one or both of the first FET switch portion 57c and the second FET switch portion 57f being set to the ON state by the CPU 72, thereby activating the capacitor 57b and/or the capacitor 57e, which are respectively serially connected to the first FET switch portion 57c and the second FET switch portion 57f, and the capacitance (C) value changes, whereby it is possible to adjust the resonance frequency.

For example, before factory shipment, confirmation is performed regarding whether the resonance frequency of the RFID portion 41 falls within a predetermined frequency range X due to variations in the terminal capacitance of RFID chip 51 and the like, and it is determined whether both of the first FET switch portion 57c and the second FET switch portion 57f are set to the OFF state, or any one or both of them are set to the ON state.

Moreover, after factory shipment, the CPU 72 supplies a voltage to none of, any one or both of the first FET switch portion 57c and the second FET switch portion 57f, in accordance with the determination made before factory shipment. In this way, the RFID portion 41 secures a stable communication quality without causing the resonance frequency to fall out of specification due to variations in the terminal capacitance and the like of the RFID chip 51.

Figure 13A:
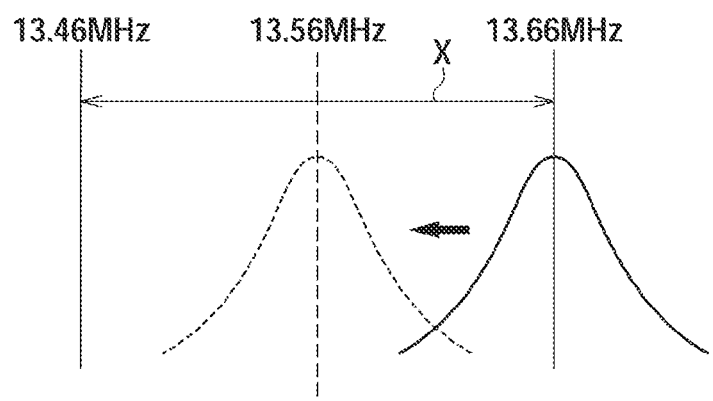
FIG. 13 is a diagram illustrating adjustment for moving the resonance frequency to within specification.
Figure 13B:
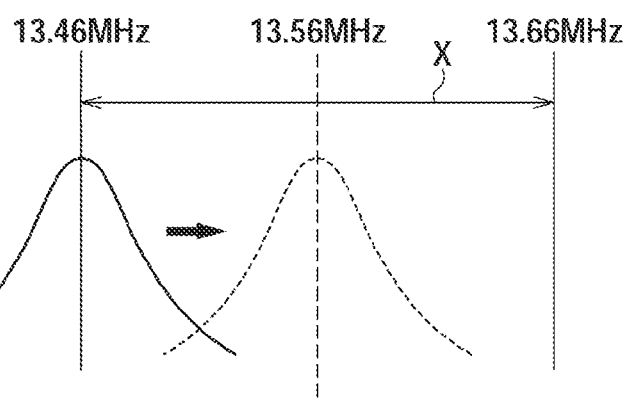

More specifically, before factory shipment, any one of the first FET switch portion 57c and the second FET switch portion 57f is set to the ON state in advance. In addition, in a case in which the resonance frequency falls out of specification toward a high frequency side (exceeds the predetermined frequency range X), another switch portion is set to the ON state as well, i.e., both of the first FET switch portion 57c and the second FET switch portion 57f are set to the ON state. By setting in this way, the resonance frequency can fall within specification (see FIG. 13 A). Moreover, in a case in which the resonance frequency falls out of specification toward a low frequency side, the first FET switch portion 57c or the second FET switch portion 57f, which is set to the ON state in advance, is set to the OFF state, i.e. both of the first FET switch portion 57c and the second FET switch portion 57f are set to the OFF state. By setting in this way, the resonance frequency can fall within specification (see FIG. 13 B).

With such a configuration, the cellular telephone device 1 according to the present invention selectively supplies a certain voltage from the CPU 72 to the first FET switch portion 57c and the second FET switch portion 57f, thereby setting them to the ON state or the OFF state. Therefore, since the present invention makes it possible to adjust the resonance frequency by the presence or absence of the capacitors 57b and 57e for adjustment, variations in capacitance can be absorbed, a general purpose I/O port such as GPIO (General Purpose Input Output) of the CPU 72 can be utilized, and a small size and low cost can be achieved. Moreover, according to the present invention, by using the capacitors 57b and 57e of large capacitance for adjustment, it is possible to increase the range of capacitance values in a case in which the ON state is changed into the OFF state, or in a case in which the OFF state is changed into the ON state. Furthermore, there is also an advantage that the capacitance change due to temperature is small.

It should be noted that, although the reactance variable portion 57 is described as being configured with two sets, which are the first adjustment portion 57d and the second adjustment portion 57g, it is not limited thereto, and it may be configured with any one of the two sets, or may be configured with more than two sets. Moreover, in a case in which it is configured with more than two sets, many combinations of the ON state and the OFF state can be achieved, thereby making it possible to perform adjustment of the resonance frequency more precisely.

Furthermore, although the switch is assumed to be an FET in the present embodiment, it is not particularly limited thereto, and a switch may be configured in which an end of a capacitor for adjustment can be short-circuited to GND when changed into the ON state, and the switch may be, for example, a transistor, a mechanical SW or the like.

Third Configuration

Figure 14:
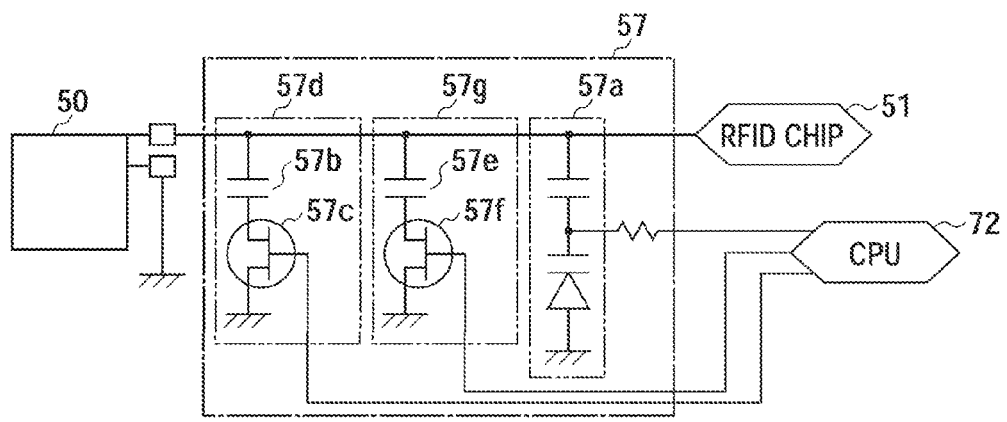
FIG. 14 is a circuit diagram showing a third configuration of the cellular telephone device according to the present invention.

As shown in FIG. 14, the reactance variable portion 57 is configured by combining the aforementioned first configuration and the second configuration, i.e. it is configured with the varicap diode 57a, the first adjustment portion 57d, and the second adjustment portion 57g, each of which is connected in parallel to the magnetic field antenna portion 50. The CPU 72 supplies a reverse bias voltage to the varicap diode 57a, and selectively supplies a certain voltage to the first FET switch portion 57c and the second FET switch portion 57f, thereby setting them to the ON state or the OFF state.

Moreover, as for the varicap diode 57a, a capacitance (C) value of the serially connected capacitors changes depending on an applied reverse bias voltage value; in addition, any one or both of the first FET switch portion 57c and the second FET switch portion 57f are set to the ON state by the CPU 72, thereby activating the capacitor 57b and/or the capacitor 57e, which are respectively serially connected to the first FET switch portion 57c and the second FET switch portion 57f, and the capacitance (C) value changes, thereby adjusting the resonance frequency.

According to the present configuration, in a case in which the resolution of the control voltage by the varicap diode 57a is low, and thus the resonance frequency moves to the opposite side of the specification X in an adjustable range Y depending on adjustment of the varicap diode 57a (for example, in a case in which the resonance frequency falls out of specification toward the high frequency side, and when a certain reverse bias voltage is applied to the varicap diode 57a, the resonance frequency falls out of specification toward the low frequency side to the contrary), the adjustable range Y for the varicap diode 57a is set to be narrow to an extent that the resonance frequency does not move to the opposite side of the specification X in the adjustable range Y, and is made smaller than the overall variation. In other words, in a case in which the resonance frequency falls out of the adjustable range Y of the varicap diode 57a, rough adjustment is performed by the first FET switch portion 57c and the second FET switch portion 57f such that the resonance frequency moves to the adjustable range Y of the varicap diode 57a, and subsequently fine adjustment is performed by the varicap diode 57a such that the central position of the resonance frequency moves to a predetermined position in the specification X (see FIG. 15).

In this way, the present invention is effective in a case in which the distribution of the resonance frequency is larger than the specification X.

It should be noted that, although the reactance variable portion 57 is described as being configured to include two sets, which are the first adjustment portion 57d and the second adjustment portion 57g, it is not limited thereto, and it may be configured with any one of the two sets, or may be configured with more than two sets. Moreover, in a case in which it is configured with more than two sets, many combinations of the ON state and the OFF state can be achieved, thereby making it possible to perform adjustment of the resonance frequency more precisely.

Furthermore, although the switch is assumed to be an FET in the present embodiment, it is not particularly limited thereto, and the switch may be configured in which an end of a capacitor for adjustment can be short-circuited to GND when changed into the ON state, and the switch may be, for example, a transistor, a mechanical SW or the like.

Fourth Configuration

Figure 16:
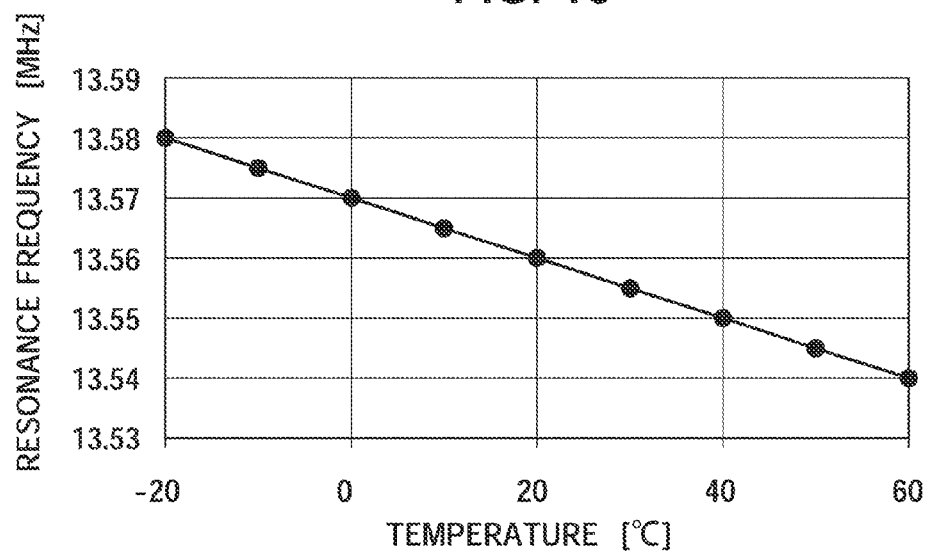
FIG. 16 is a graph showing change in resonance frequency versus temperature change of the RFID portion.

Here, the magnetic field antenna portion 50 configuring the RFID portion 41 has temperature characteristics as shown in FIG. 16, in which the resonance frequency increases as the environmental temperature decreases, and the resonance frequency decreases as the environmental temperature increases. This is caused by a change in inductance (L) value when the antenna wire material configuring the magnetic field antenna portion 50 contracts or expands by the environmental temperature change. Moreover, the terminal capacitance and the like of the RFID chip 51 also have a temperature characteristic.

Accordingly, in the cellular telephone device 1 according to the present invention, by configuring the reactance variable portion 57 with any one of the first to tenth configurations, adjustment is performed such that the resonance frequency falls within a certain range (within specification) in relation to temperature change in a predetermined range (for example, from −20 degrees Celsius to +60 degrees Celsius), and the fluctuation of the resonance frequency is adjusted, the fluctuation arising from the temperature characteristic of the terminal capacitance and the like of the RFID chip 51.

Figure 17:
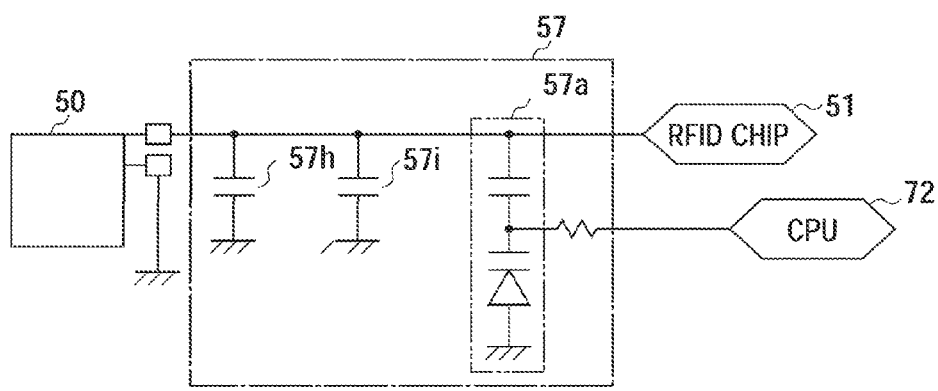
FIG. 17 is a circuit diagram showing a fourth configuration of the cellular telephone device according to the present invention.

As shown in FIG. 17, the reactance variable portion 57 is configured with the varicap diode 57a, a first capacitor 57h (for example, a temperature compensating capacitor for −750 ppm/degrees Celsius) and a second capacitor 57i (for example, a temperature compensating capacitor for −750 ppm/degrees Celsius), in which the varicap diode 57a, the first capacitor 57h and the second capacitor 57i are each connected in parallel to the magnetic field antenna portion 50.

The CPU 72 supplies a reverse bias voltage to the varicap diode 57a. Capacitance of the varicap diode 57a varies in response to a voltage value of the reverse bias voltage supplied from the CPU 72. It should be noted that, as shown in FIG. 11, the varicap diode 57a has a characteristic in which capacitance between terminals varies at a predetermined rate in relation to application of the reverse bias voltage.

For example, before factory shipment, confirmation is performed regarding whether the resonance frequency of the RFID portion 41 falls within a predetermined range due to variations in the terminal capacitance of the RFID chip 51, the magnetic field antenna portion 50 and the like, and a voltage value supplied from the CPU 72 to the varicap diode 57a is determined.

Moreover, after factory shipment, by applying a predetermined reverse bias voltage (for example, +3 V), which has been determined before factory shipment, to the varicap diode 57a from the CPU 72, stable communication quality is secured in the RFID portion 41 without causing the resonance frequency to fall out of specification due to variations in the terminal capacitance of the RFID chip 51 and the like.

Furthermore, the first capacitor 57h has a temperature-reactance characteristic that is inverse to an amount in which the inductance (L) value of the magnetic field antenna portion 50 fluctuates in relation to temperature change.

In addition, the second capacitor 57i has a temperature-reactance characteristic that is inverse to an amount in which the capacitance (C) value arising from the terminal capacitance of the RI FD chip 51 and the like fluctuates in relation to the temperature change. It should be noted that the varicap diode 57a also has a temperature characteristic, which is adjusted by the second capacitor 57i in the present embodiment.

Figure 18:
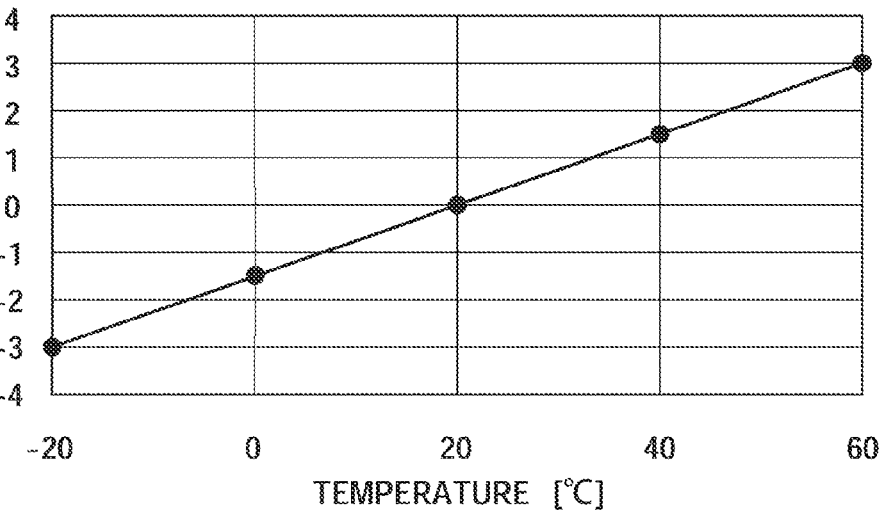
FIG. 18 is a graph showing an inductance value change rate in the magnetic field antenna versus temperature change.
Figure 19:
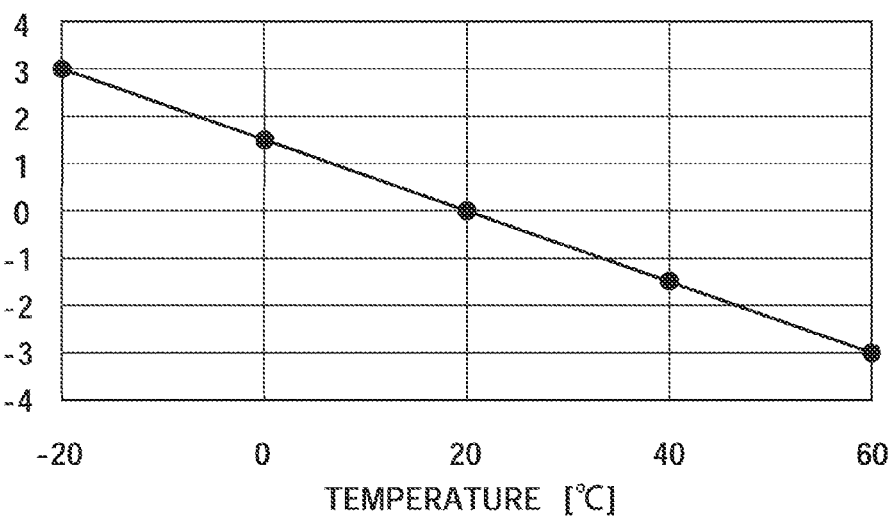
FIG. 19 is a graph showing a capacitance change rate in the capacitor versus temperature change.

Therefore, for example, in a case in which the inductance value change rate versus temperature change (for example, from −20 degrees Celsius to +60 degrees Celsius) in the magnetic field antenna portion 50 has a characteristic as shown in FIG. 18 (for example, relative to 20 degrees Celsius, the inductance value change rate increases as the temperature increases, and the inductance value change rate decreases as the temperature decreases), the first capacitor 57h is connected in parallel to the magnetic field antenna portion 50, the first capacitor 57h having a characteristic in which the capacitance change rate is inverse to the inductance value change rate; that is, for example, relative to 20 degrees Celsius, the capacitance change rate decreases as the temperature increases, and the capacitance change rate increases as the temperature decreases (see FIG. 19).

Figure 20:
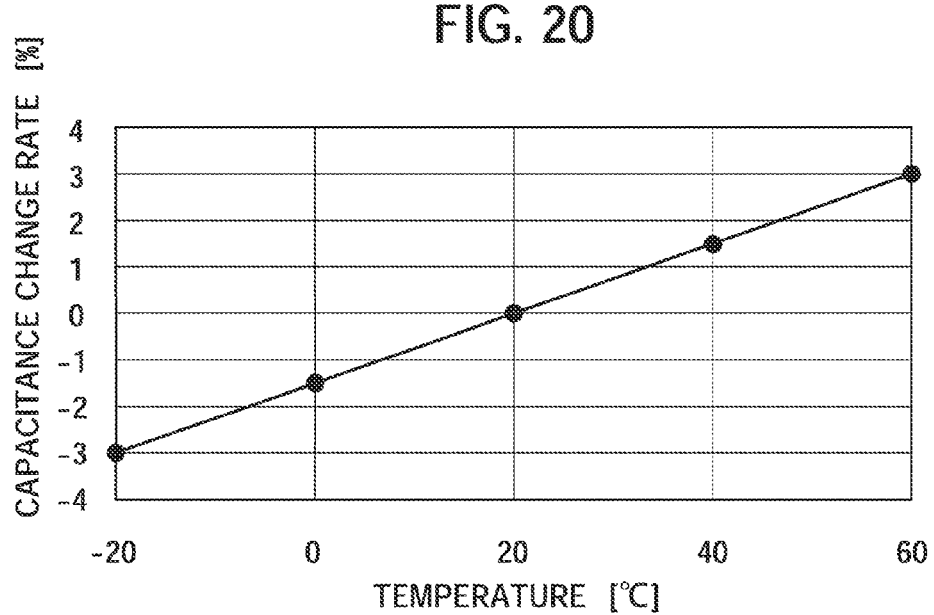
FIG. 20 is a graph showing a capacitance change rate in the RFID chip or the like versus temperature change.
Figure 21:
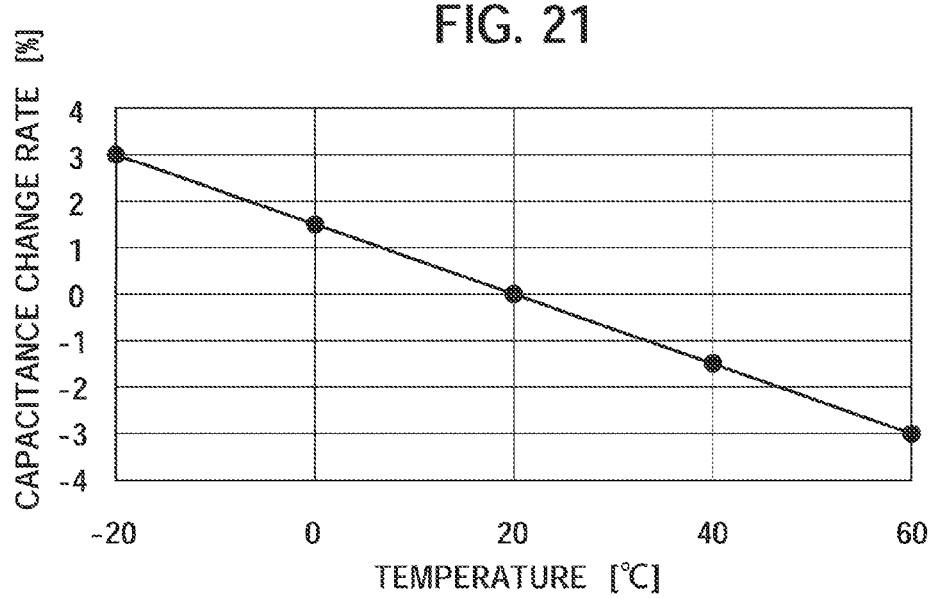
FIG. 21 is a graph showing a capacitance change rate in the capacitor versus temperature change.

Moreover, for example, in a case in which the C value change rate in relation to terminal capacitance of the RFID chip 51 or temperature change (for example, from −20 degrees Celsius to +60 degrees Celsius) in the varicap diode 57a has a characteristic as shown in FIG. 20 (for example, relative to 20 degrees Celsius, the C value change rate increases as the temperature increases, and the C value change rate decreases as the temperature decreases), the second capacitor 57i is connected in parallel to the varicap diode 57a and the like, the second capacitor 57i having a characteristic in which the capacitance change rate is inverse to the C value change rate; that is, for example, relative to 20 degrees Celsius, the capacitance change rate decreases as the temperature increases, and the capacitance change rate increases as the temperature decreases (see FIG. 21).

Figure 22:
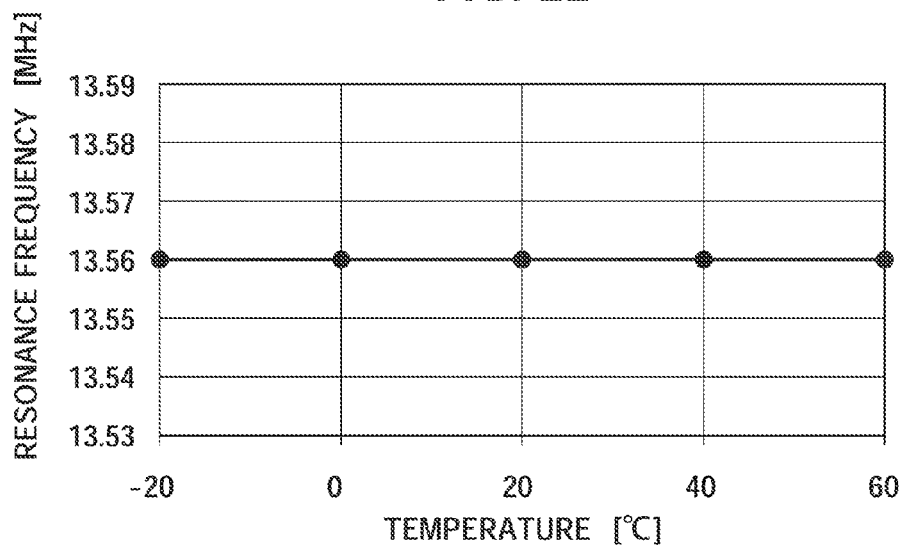
FIG. 22 is a graph showing a characteristic of the resonance frequency versus temperature change of the RDID portion in a case in which a temperature compensating capacitor is used.

With such a configuration, as shown in FIG. 22, the cellular telephone device 1 according to the present invention as an entire set can be configured such that the temperature characteristics of the magnetic field antenna portion 50 and the like are canceled, the variations in terminal capacitance of the RFID chip 51 and the like are canceled, and the resonance frequency does not fluctuate in relation to the temperature change in a predetermined range (for example, from −20 degrees Celsius to +60 degrees Celsius).

Fifth Configuration

Figure 23:
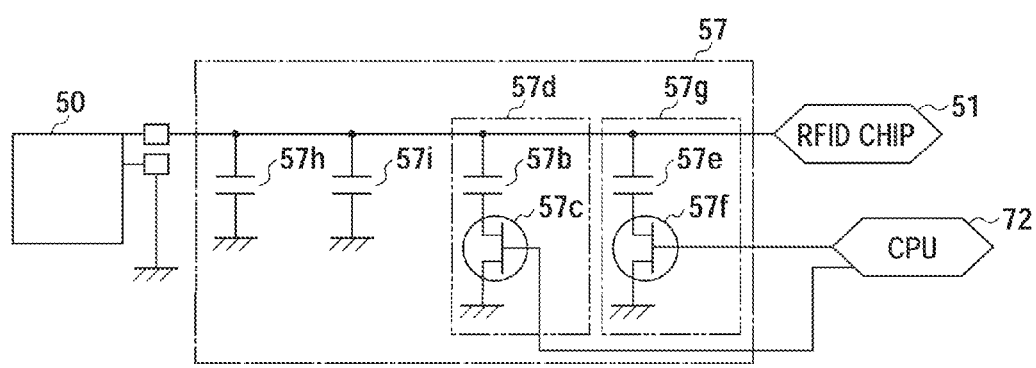
FIG. 23 is a circuit diagram showing a fifth configuration of the cellular telephone device according to the present invention.

As shown in FIG. 23, the reactance variable portion 57 is configured with the first adjustment portion 57d, the second adjustment portion 57g, the first capacitor 57h (for example, a temperature compensating capacitor for −750 ppm/degrees Celsius), and the second capacitor 57i (for example, a temperature compensating capacitor for −750 ppm/degrees Celsius), each of which is connected in parallel to the magnetic field antenna portion 50.

Behavior of the first adjustment portion 57d and the second adjustment portion 57g is similar to those in the aforementioned second configuration, and behavior of the first capacitor 57h and the second capacitor 57i is similar to those in the aforementioned fourth configuration.

With such a configuration, in the cellular telephone device 1 according to the present invention, by configuring the reactance variable portion 57 with the first adjustment portion 57d, the second adjustment portion 57g, the first capacitor 57h, and the second capacitor 57i, the entire set can be configured such that the temperature characteristics of the magnetic field antenna portion 50 and the like are canceled, the variations in the terminal capacitance of the RFID chip 51 and the like are canceled, and the resonance frequency does not fluctuate in relation to the temperature change in a predetermined range (for example, from −20 degrees Celsius to +60 degrees Celsius).

It should be noted that, although the reactance variable portion 57 is described as being configured to include two sets, which are the first adjustment portion 57d and the second adjustment portion 57g, it is not limited thereto, and it may be configured with any one of the two sets, or may be configured with more than two sets. Moreover, in a case in which it is configured with more than two sets, many combinations of the ON state and the OFF state can be achieved, thereby making it possible to perform adjustment of the resonance frequency more precisely.

Furthermore, although the switch is assumed be an FET in the present embodiment, it is not particularly limited thereto, and the switch may be configured in which an end of a capacitor for adjustment can be short-circuited to GND when changed into the ON state, and the switch may be, for example, a transistor, a mechanical SW or the like.

Sixth Configuration

Figure 24:
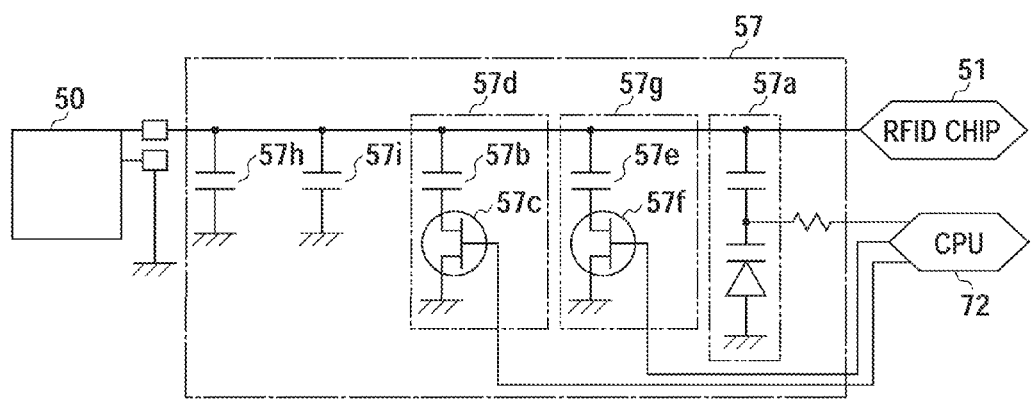
FIG. 24 is a circuit diagram showing a sixth configuration of the cellular telephone device according to the present invention.

As shown in FIG. 24, the reactance variable portion 57 is configured by combining the aforementioned fourth configuration and the fifth configuration, and is configured with the varicap diode 57a, the first adjustment portion 57d, the second adjustment portion 57g, the first capacitor 57h (for example, a temperature compensating capacitor for −750 ppm/degrees Celsius), and the second capacitor 57i (for example, a temperature compensating capacitor for −750 ppm/degrees Celsius), in which the varicap diode 57a, the first capacitor 57h and the second capacitor 57i are each connected in parallel to the magnetic field antenna portion 50.

Behavior of the varicap diode 57a is similar to that in the aforementioned first configuration, behavior of the first adjustment portion 57d and the second adjustment portion 57g is similar to that in the aforementioned second configuration, and behavior of the first capacitor 57h and the second capacitor 57i is similar to that in the aforementioned fourth configuration.

With such a configuration, in the cellular telephone device 1 according to the present invention, by configuring the reactance variable portion 57 with the varicap diode 57a, the first adjustment portion 57d, the second adjustment portion 57g, the first capacitor 57h, and the second capacitor 57i, the entire set can be configured such that the temperature characteristics of the magnetic field antenna portion 50 and the like are canceled, the variations in the terminal capacitance of the RFID chip 51 and the like are canceled, and the resonance frequency does not fluctuate in relation to the temperature change in a predetermined range (for example, from −20 degrees Celsius to +60 degrees Celsius).

It should be noted that, although the reactance variable portion 57 is described as being configured to include two sets, which are the first adjustment portion 57d and the second adjustment portion 57g, it is not limited thereto, and it may be configured with any one of the two sets, or may be configured with more than two sets. Moreover, in a case in which it is configured with more than two sets, many combinations of the ON state and the OFF state can be achieved, thereby making it possible to perform adjustment of the resonance frequency more precisely.

Furthermore, although the switch is assumed to be an FET in the present embodiment, it is not particularly limited thereto, and a switch may be configured in which an end of a capacitor for adjustment can be short-circuited to GND when changed into the ON state, and the switch may be, for example, a transistor, a mechanical SW or the like.

Seventh Configuration

Figure 25:
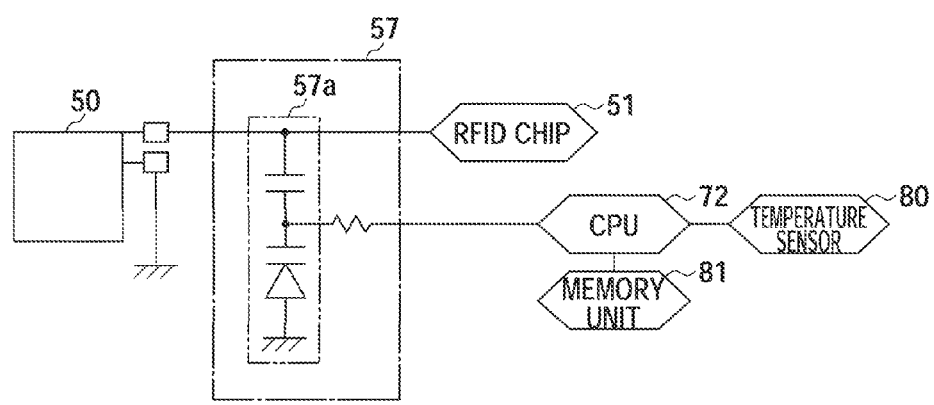
FIG. 25 is a circuit diagram showing a seventh configuration of the cellular telephone device according to the present invention.

The cellular telephone device 1 is configured as shown in FIG. 25, in which the reactance variable portion 57 is configured with the varicap diode 57a, and in which a temperature sensor 80 and a memory unit 81 are connected to the CPU 72. Moreover, the varicap diode 57a is connected in parallel to the magnetic field antenna portion 50.

The temperature sensor 80 detects environmental temperature, and transmits the detected temperature to the CPU 72.

The memory unit 81 stores a table for determining a voltage value of a reverse bias voltage to be applied to the varicap diode 57a in response to the environmental temperature change.

The CPU 72 refers to the table stored in the memory unit 81 based on a detected temperature transmitted from the temperature sensor 80, determines a voltage value of a reverse bias voltage to be applied to the varicap diode 57a, and supplies the reverse bias voltage corresponding to the determined voltage value to the varicap diode 57a. Capacitance of the varicap diode 57a varies in response to a voltage value of the reverse bias voltage supplied from the CPU 72. It should be noted that, as shown in FIG. 11, the varicap diode 57a has a characteristic in which capacitance between terminals varies at a predetermined rate in relation to application of the reverse bias voltage.

With such a configuration, environmental temperature for actual use is detected by the temperature sensor 80 before factory shipment, and the table stored in advance in the memory unit 81 is referred to, thereby determining a reverse bias voltage value to be supplied to the varicap diode 57a; therefore, it is possible to adjust a movement amount of the resonance frequency in a short time, and to perform adjustment into a predetermined specification. Moreover, after factory shipment, a movement amount of the resonance frequency accompanied by temperature change can be adaptively adjusted in accordance with the user's operating conditions.

Eighth Configuration

Figure 26:
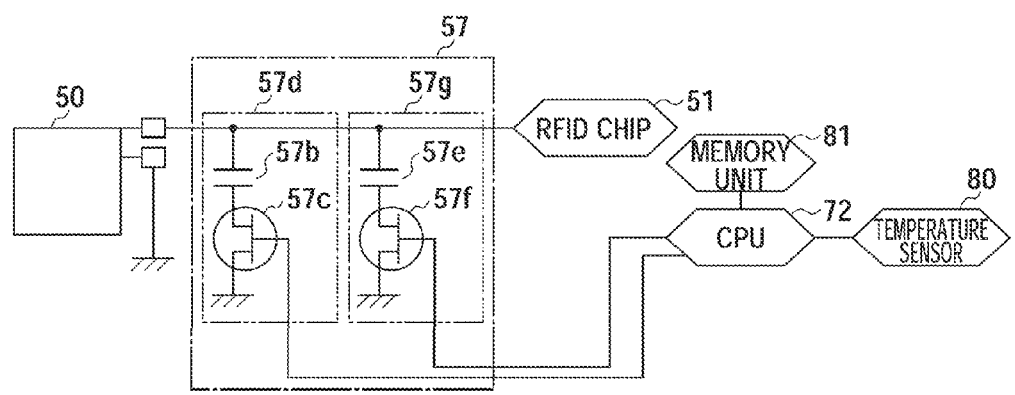
FIG. 26 is a circuit diagram showing an eighth configuration of the cellular telephone device according to the present invention.

The cellular telephone device 1 is configured as shown in FIG. 26, in which the reactance variable portion 57 is configured with the first adjustment portion 57d and the second adjustment portion 57g, and in which the temperature sensor 80 and the memory unit 81 are connected to the CPU 72. Moreover, the first adjustment portion 57d and the second adjustment portion 57g are each connected in parallel to the magnetic field antenna portion 50.

The temperature sensor 80 detects environmental temperature, and transmits the detected temperature to the CPU 72.

The memory unit 81 stores a table for determining how to switch the ON state and the OFF state of the first FET switch portion 57c and the second FET switch portion 57f in response to the environmental temperature change. It should be noted that the table is configured with four modes of the first FET switch portion 57c and the second FET switch portion 57f, i.e. both of them are in the ON state, any one of them is in the ON state, or both of them are in the OFF state, in response to the environmental temperature change.

The CPU 72 refers to the table stored in the memory unit 81 based on the detected temperature transmitted from the temperature sensor 80, determines which FET switch portion should be turned into the ON state or the OFF state, and supplies a certain voltage to the determined FET switch portion.

Here, any one or both of the first FET switch portion 57c and the second FET switch portion 57f are set to the ON state by the CPU 72, thereby activating the capacitor 57b and/or the capacitor 57e, which are respectively serially connected to the first FET switch portion 57c and the second FET switch portion 57f, and the capacitance (C) value changes, thereby making it possible to adjust the resonance frequency.

It should be noted that a configuration may be employed in which any one of the first FET switch portion 57c and the second FET switch portion 57f is set to the ON state in advance. In this case, when the resonance frequency falls out of specification (exceeds a predetermined frequency range X) toward the high frequency side, one of the FET switch portions is set to the ON state such that both of the FET switch portions are in the ON state; and when the resonance frequency falls out of specification toward the low frequency side, another one of the FET switch portions is set to the OFF state such that both of the FET switch portions are in the OFF state. By setting in this way, the resonance frequency can fall within the specification.

With such a configuration, the environmental temperature for actual use is detected by the temperature sensor 80 before factory shipment, and the table stored in advance in the memory unit 81 is referred to, thereby determining the ON state and the OFF state of the first FET switch portion 57c and the second FET switch portion 57f, and supplying a voltage to the FET switch portion determined to be in the ON state; therefore, it is possible to adjust a movement amount of the resonance frequency in a short time, and to perform adjustment to a predetermined specification. Moreover, after factory shipment, a movement amount of the resonance frequency accompanied by temperature change can be adaptively adjusted in accordance with the user's operating conditions.

It should be noted that, although the reactance variable portion 57 is described as being configured to include two sets, which are the first adjustment portion 57d and the second adjustment portion 57g, it is not limited thereto, and it may be configured with any one of the two sets, or may be configured with more than two sets. Moreover, in a case in which it is configured with more than two sets, many combinations of the ON state and the OFF state can be achieved, thereby making it possible to perform adjustment of the resonance frequency more precisely.

Furthermore, although the switch is assumed to be an FET in the present embodiment, it is not particularly limited thereto, and a switch may be configured in which an end of a capacitor for adjustment can be short-circuited to GND when changed into the ON state, and the switch may be, for example, a transistor, a mechanical SW or the like.

Ninth Configuration

Figure 27:
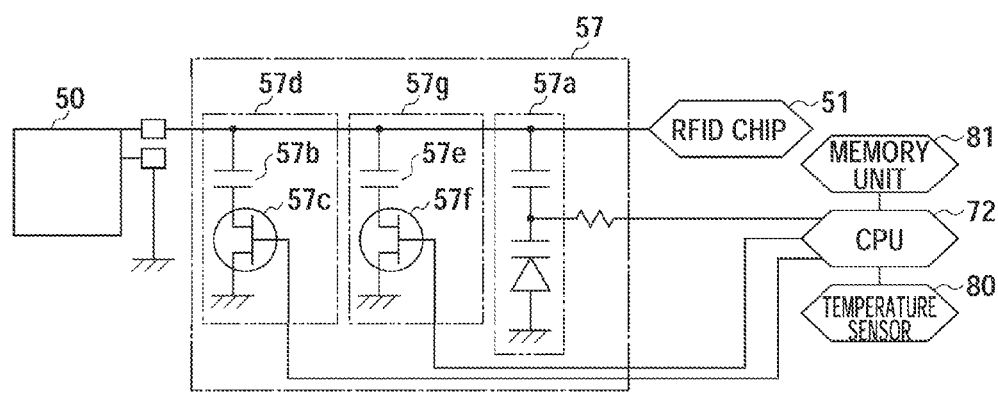
FIG. 27 is a circuit diagram showing a ninth configuration of the cellular telephone device according to the present invention.

As shown in FIG. 27, the cellular telephone device 1 is configured by combining the aforementioned seventh configuration and the eighth configuration, in which the reactance variable portion 57 is configured with the varicap diode 57a, the first adjustment portion 57d, and the second adjustment portion 57g, and in which the temperature sensor 80 and the memory unit 81 are connected to the CPU 72. Moreover, the varicap diode 57a, the first adjustment portion 57d, and the second adjustment portion 57g are each connected in parallel to the magnetic field antenna portion 50.

Behavior of the varicap diode 57a is similar to that in the aforementioned seventh configuration, behavior of the first adjustment portion 57d and the second adjustment portion 57g is similar to that in the aforementioned eighth configuration, and behavior of the CPU 72 is similar to that in the aforementioned seventh configuration and the eighth configuration.

The temperature sensor 80 detects environmental temperature, and transmits the detected temperature to the CPU 72.

The memory unit 81 stores: a first table for determining a voltage value of a reverse bias voltage to be applied to the varicap diode 57a in response to the environmental temperature change; and a second table for determining how to switch the ON state and the OFF state of the first FET switch portion 57c and the second FET switch portion 57f in response to the environmental temperature change.

According to the present configuration, in a case in which the resolution of the control voltage by the varicap diode 57a is low, and thus the resonance frequency moves to the opposite side of the specification X in an adjustable range Y depending on adjustment of the varicap diode 57a (for example, in a case in which the resonance frequency falls out of specification toward the high frequency side, and when a certain reverse bias voltage is applied to the varicap diode 57a, the resonance frequency falls out of specification toward the low frequency side to the contrary), the adjustable range Y for the varicap diode 57a is set to be narrow to an extent that the resonance frequency does not move to the opposite side of the specification X in the adjustable range Y, and is made smaller than the overall variation.

Figure 15:
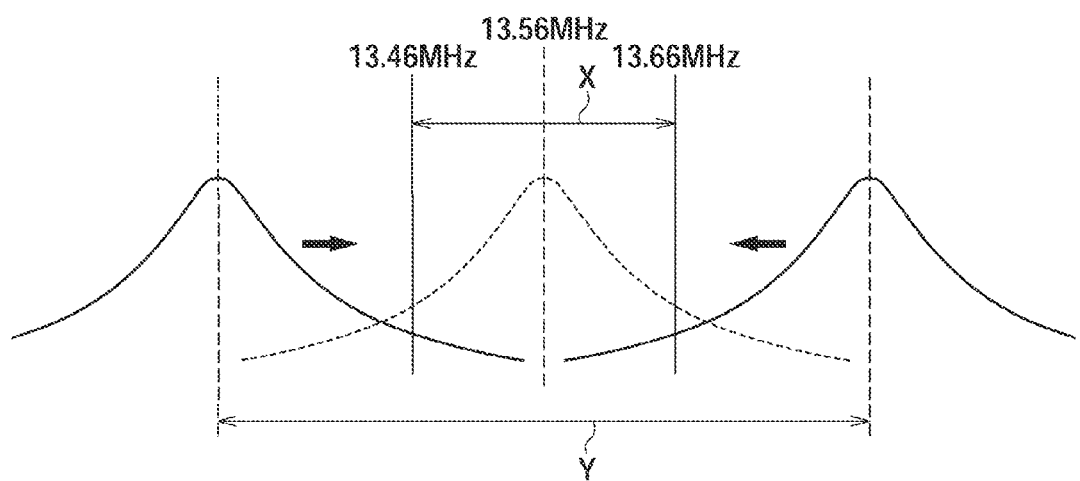
FIG. 15 is a diagram illustrating adjustment for moving the resonance frequency into the specification.

In a case in which the resonance frequency falls out of the adjustable range Y of the varicap diode 57a, the CPU 72 refers to the second table stored in the memory unit 81 based on the environmental temperature detected by the temperature sensor 80, changes the states of the first FET switch portion 57c and the second FET switch portion 57f, and performs rough adjustment such that the resonance frequency moves to the adjustable range Y of the varicap diode 57a; and subsequently, the CPU 72 refers to the first table stored in the memory unit 81 based on the environmental temperature, supplies a predetermined voltage to the varicap diode 57a, and performs fine adjustment such that the central position of the resonance frequency moves to a predetermined position in the specification X (see FIG. 15).

In this way, the present invention makes it possible to adjust a movement amount of the resonance frequency in a short time, and to perform adjustment to a predetermined specification X. Moreover, after factory shipment, a movement amount of the resonance frequency accompanied by temperature change can be adaptively adjusted in accordance with the user's operating conditions. Furthermore, the present invention is effective in a case in which the distribution of the resonance frequency is larger than the specification X.

It should be noted that, although the reactance variable portion 57 is described as being configured to include two sets, which are the first adjustment portion 57d and the second adjustment portion 57g, it is not limited thereto, and it may be configured with any one of the two sets, or may be configured with more than two sets. Moreover, in a case in which it is configured with more than two sets, many combinations of the ON state and the OFF state can be achieved, thereby making it possible to perform adjustment of the resonance frequency more precisely.

Furthermore, although the switch is assumed be an FET in the present embodiment, it is not particularly limited thereto, and a configuration may be configured in which an end of a capacitor for adjustment can be short-circuited to GND when changed into the ON state, and the switch may be, for example, a transistor, a mechanical SW or the like.

Tenth Configuration

Here, as described above, in the second configuration, the third configuration, the fifth configuration, the sixth configuration, the eighth configuration and the ninth configuration, the reactance variable portion 57 is configured to include the FET switch portions, and the method for adjusting the resonance frequency of the RFID portion 41 by switching the states of the FET switch portions has been presented.

Figure 28:
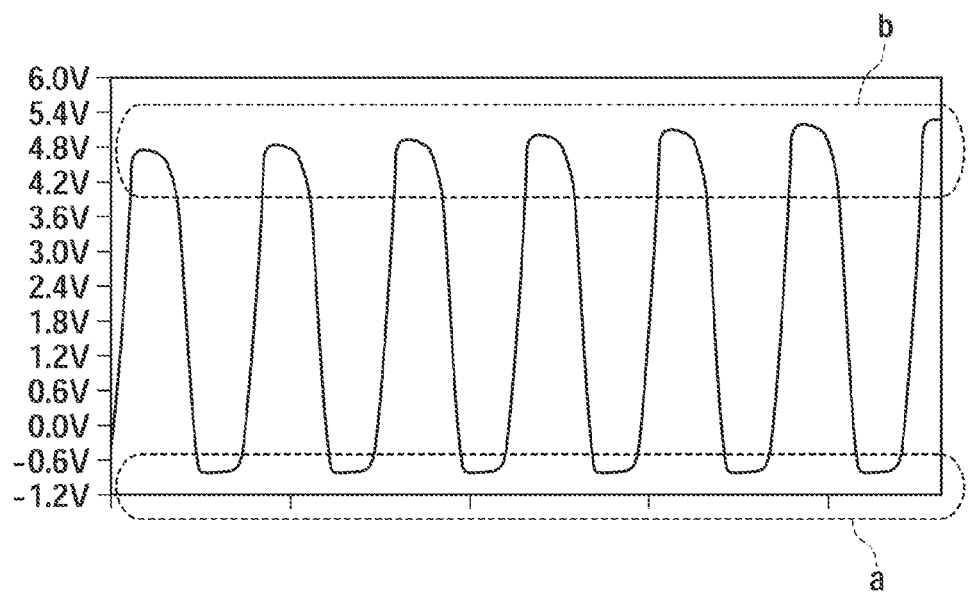
FIG. 28 is a graph showing a waveform of an input signal when a high voltage is applied to a drain terminal side of an FET.

Incidentally, in general, since the amplitude level of the voltage value applied to the RFID portion 41 is greater than that used in the other configuration portions in the cellular telephone device 1, the parasitic drain-source diode of the FET may be rectified, and the quality of waveforms may be deteriorated in some cases. In addition, particularly in a case in which a large signal is input when the FET is in the OFF state, a high voltage may be applied to the drain terminal side of the FET, and the input signal may be distorted in some cases (see FIG. 28). As shown in FIG. 28, the upper end portion ("a" in FIG. 28) and the lower end portion ("b" in FIG. 28) of the signal waveforms are distorted.

Figure 29:
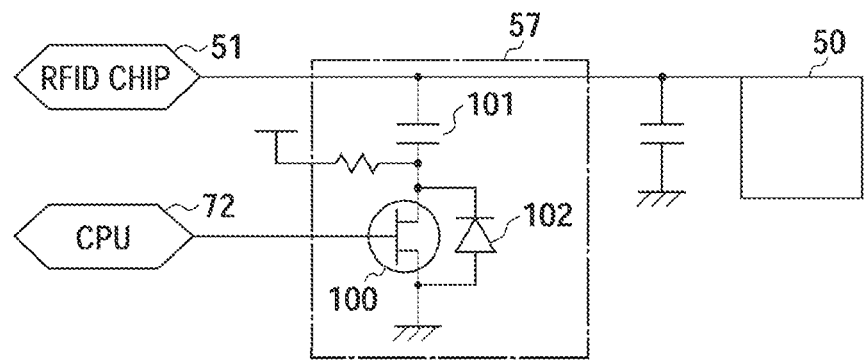
FIG. 29 is a circuit diagram showing a tenth configuration of the cellular telephone device according to the present invention.
Figure 30:
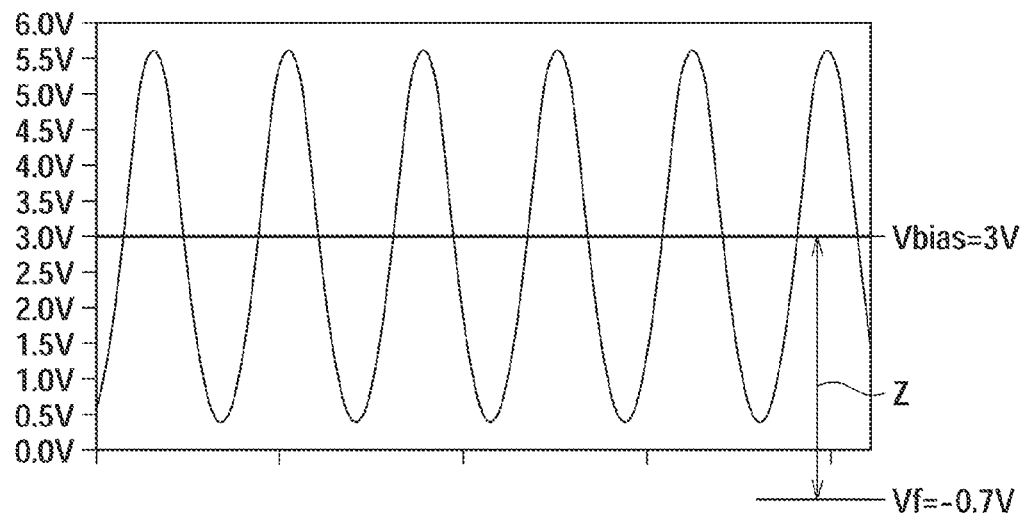
FIG. 30 is a graph showing a waveform of an input signal when a high voltage is applied to the drain terminal side of the FET in the tenth configuration shown in FIG. 29.

Accordingly, in the cellular telephone device 1, in a case in which the reactance variable portion 57 is configured to include an FET switch portion 100 as shown in FIG. 29, by adjusting capacitance of the capacitor 101 for adjustment and by configuring the drain terminal of the FET to be biased by a predetermined voltage, the voltage that is input to the drain of the FET can be optimized, and rectifying of the parasitic diode can be avoided. By such a configuration, the upper end portion and the lower end portion of the input signal are not distorted as shown in FIG. 30. It should be noted that the reference numeral 102 in FIG. 29 schematically denotes the parasitic diode of the FET. Moreover, half of the amplitude falls within Z that is between Vbias and Vf.

Figure 31:
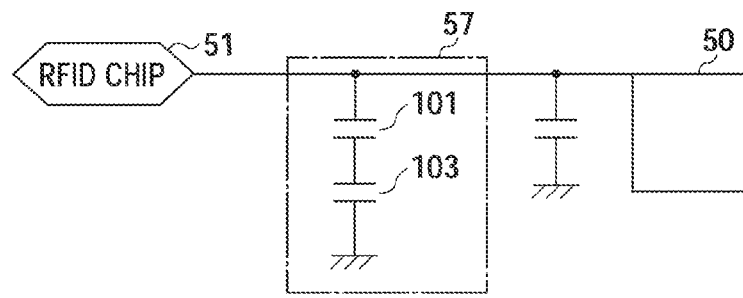
FIG. 31 is a circuit diagram showing a circuit equivalent to the tenth configuration shown in FIG. 29.

Furthermore, in a case in which the FET is in the OFF state, the circuit diagram shown in FIG. 29 can be equivalently represented as a circuit diagram shown in FIG. 31. Here, when it is assumed that the capacitance of the capacitor 101 for adjustment is C1, the capacitance when the FET is in the OFF state (hereinafter referred to as OFF capacitance 103) is C2, and the input voltage of the magnetic field antenna portion 50 is Vin, a voltage Vd applied to the drain terminal of the FET is calculated by the following expression (2).

$$Vd = (C2/(C1*C2/(C1+C2)))*Vin \qquad (2)$$

Moreover, when it is assumed that a bias voltage applied to the drain terminal of the FET is Vbias, and a voltage when the parasitic diode starts to be rectified is Vf, the voltage Vd applied to the drain terminal of the FET needs to be at least $((Vbias-Vf)*2)Vp-p$ when the input voltage Vin of the magnetic field antenna portion 50 is a maximum (see FIG. 30).

Furthermore, the CPU 72 supplies a certain voltage to the FET switch portion 100, thereby switching the OFF state to the ON state thereof. In a case in which the FET switch portion 100 is in the ON state, the capacitance is only capacitance of the capacitor 101 for adjustment that is serially connected to the FET switch portion 100. Moreover, in a case in which the FET switch portion 100 is in the OFF state, the capacitance is the total capacitance of the OFF capacitance 103 of the FET and the capacitor 101 for adjustment.

Furthermore, in the present invention, for example, before factory shipment, confirmation is performed regarding whether the resonance frequency of the RFID portion 41 falls within a predetermined frequency range due to variations in the terminal capacitance of the RFID chip 51, the magnetic field antenna portion 50 and the like, and a state of the FET switch portion 100 is set (to the ON state or the OFF state), thereby securing a stable communication quality without the resonance frequency falling out of specification.

In addition, in a case in which the variable step number and the variable step size when adjusting the resonance frequency are desired to be changed, the capacitance value of the capacitor for adjustment is appropriately changed, or the adjustment portion that is configured with the capacitor 101 for adjustment and the FET switch portion 100 is configured to have a plurality of steps, in accordance with a desired variable step number or a variable step size.

Figure 32:
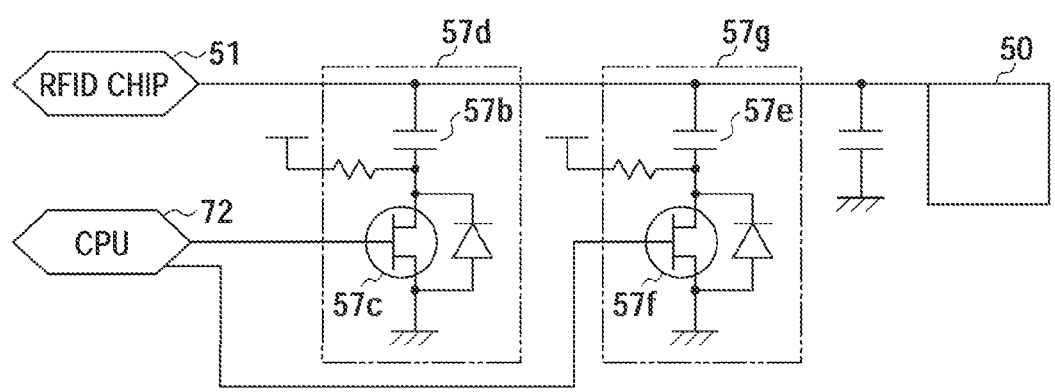
FIG. 32 is a specific circuit diagram of the tenth configuration shown in FIG. 29.

For example, as shown in FIG. 32, in a case in which the cellular telephone device 1 is configured with a portion (the first adjustment portion 57d) in which the first FET switch portion 57c is serially connected to the capacitor 57b for adjustment and a portion (the second adjustment portion 57g) in which the second FET switch portion 57f is serially connected to the capacitor 57e for adjustment, the drain terminal of the first FET switch portion 57c is biased by a predetermined voltage, and the drain terminal of the second FET switch portion 57f is biased by a predetermined voltage, then total capacitance varies depending on the states of the first FET switch portion 57c and the second FET switch portion 57f.

More specifically, in a case in which both of the first FET switch portion 57c and the second FET switch portion 57f are in the OFF state, the capacitance is the total capacitance of the OFF capacitance of the first FET switch portion 57c, the OFF capacitance of the second FET switch portion 57f, the capacitance of the capacitor 57b for adjustment, and the capacitance of the capacitor 57e for adjustment. Moreover, in a case in which only the second FET switch portion 57f is in the ON state, the capacitance is the total capacitance of the OFF capacitance of the first FET switch portion, the capacitance of the capacitor 57b for adjustment, and the capacitance of the capacitor 57e for adjustment. Furthermore, in a case in which only the first FET switch portion 57c is in the ON state, the capacitance is the total capacitance of the OFF capacitance of the second FET switch portion, the capacitance of the capacitor 57b for adjustment, and the capacitance of the capacitor 57e for adjustment. In addition, in a case in which both of the FET switch portions are in the ON state, the capacitance is total capacitance of the capacitance of the capacitor 57b for adjustment and the capacitance of the capacitor 57e for adjustment.

In this way, according to the present invention, the capacitance value can be adjusted without rectifying the parasitic drain-source diode of the FET, and the quality of waveforms of the input signal is not affected either.

Moreover, according to the present invention, as shown in the aforementioned first to tenth configurations, since the temperature compensation is performed by connecting the reactance variable portion 57 that can change the resonance frequency of the magnetic field antenna portion 50 in parallel, it is not necessary to perform the temperature compensation in the magnetic field antenna portion 50 that is the antenna assembly side, and the design flexibility in the antenna assembly side can be enhanced. Furthermore, since the antenna assembly side does not require a design change for temperature compensation, the versatility can be enhanced, and a cost reduction can be achieved.

THIRD EMBODIMENT

A description is provided hereinafter regarding the third embodiment of the present invention. Here, the cellular telephone device 1 according to the third embodiment is similar in configuration to the cellular telephone device 1 according to the first and second embodiments except for the inductance portion 58 for adjustment in the RFID portion 41. A description is provided hereinafter regarding the cellular telephone device 1 according to the third embodiment mainly in terms of differences from the cellular telephone device 1 according to the first and second embodiments, and other descriptions are omitted.

Figure 33:
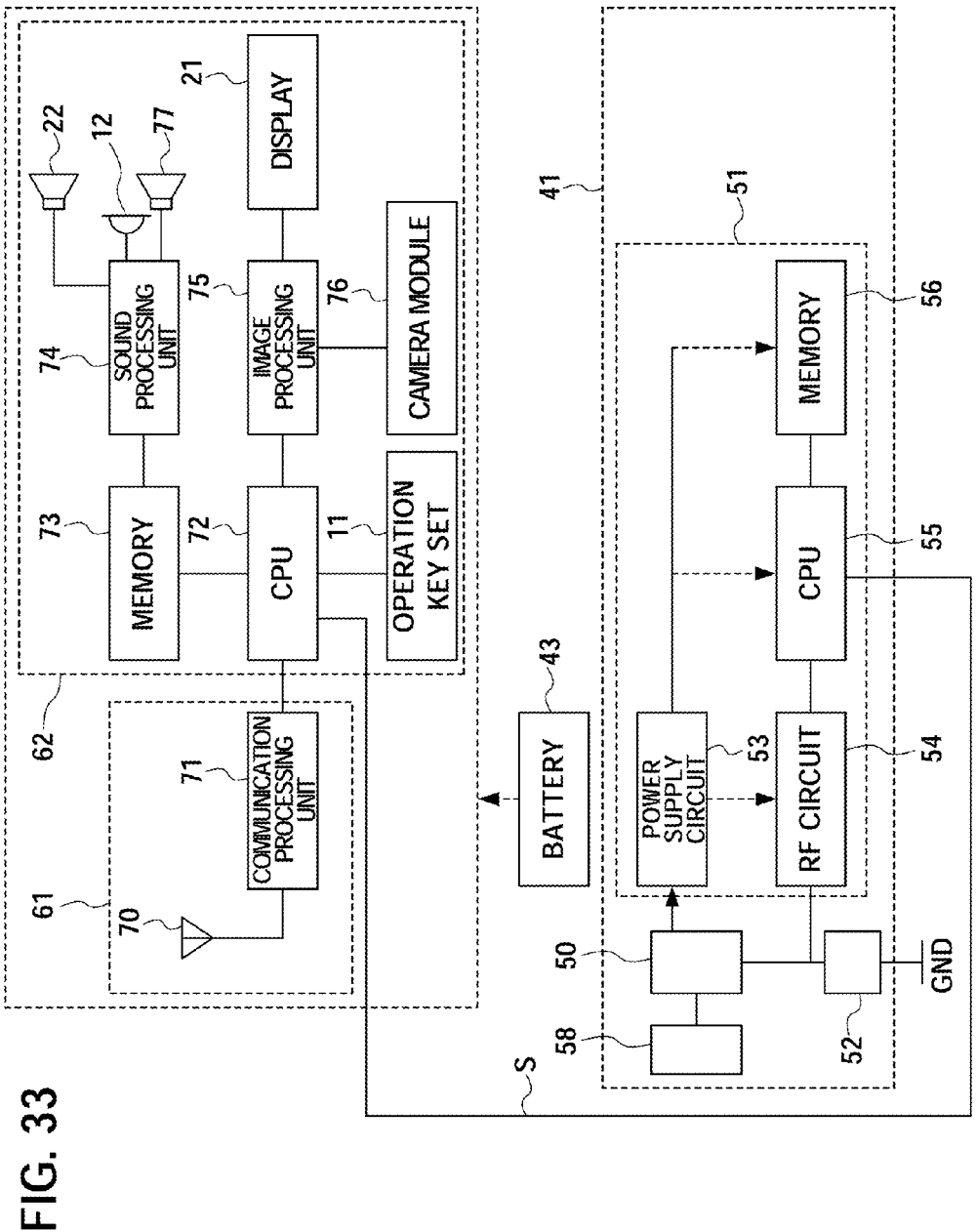
FIG. 33 is a block diagram showing features of the cellular telephone device according to the present invention.

FIG. 33 is a functional block diagram showing features of the cellular telephone device 1. As shown in FIG. 33, the cellular telephone device 1 includes: the RFID portion 41 that is the first communication unit 60; the second communication unit 61 that communicates with external terminals; and the processing unit 62 that processes information communicated by the second communication unit 61.

As described above, the RFID portion 41 includes: the magnetic field antenna portion 50 that communicates with external devices by way of the first usable frequency band (for example, 13.56 MHz); the RFID chip 51; the capacitor 52; and the inductance portion 58 for adjustment.

It should be noted that the behavior and the features of the magnetic field antenna portion 50, the RFID chip 51, the power circuit 53, the RF circuit 54, the CPU 55, the memory 56, the processing unit 62, the main antenna 70, and the communication processing unit 71 are similar to those in the aforementioned first and second embodiments.

Next, a description is provided regarding characteristics of the RFID portion 41.

An extraordinarily strict frequency characteristic is required for the antenna performance of the RFID portion 41, and it is necessary to configure the resonance frequency (for example, 13.56 MHz) to fall within a certain frequency range (for example, +/−100 kHz) under a general operating environment. It should be noted that, in addition to the aforementioned resonance frequency, there are various resonance frequencies such as 13.1725 MHz+/−200 kHz or 13.61 MHz+/−75 kHz because of reasons such as consideration of influences from the configuration of terminal hardware and the like.

Moreover, the resonance frequency Fc of the RFID portion 41 is determined according to the expression (1) by a capacitance (C) value of the capacitor 52 and a total inductance (L) value of the magnetic field antenna portion 50 and the inductance portion 58 to be described later.

$$Fc = 1/(2\pi\sqrt{(L*C)}) \qquad (1)$$

Here, as for the RFID portion 41, when the resonance frequency fluctuates due to variations in the inductance value of the magnetic field antenna portion 50, the capacitance value of the capacitor 52 and the inductance value of the inductance portion 58, the terminal capacitance of the RFID chip 51 and the like, and the variations are great, then the resonance frequency may fall out of specification (the certain frequency range) required for performing stable communications in some cases.

Accordingly, in the cellular telephone device 1 according to the present invention, the resonance frequency is adjusted to fall within a certain required range (within the specification) by the following configuration.

Figure 34:
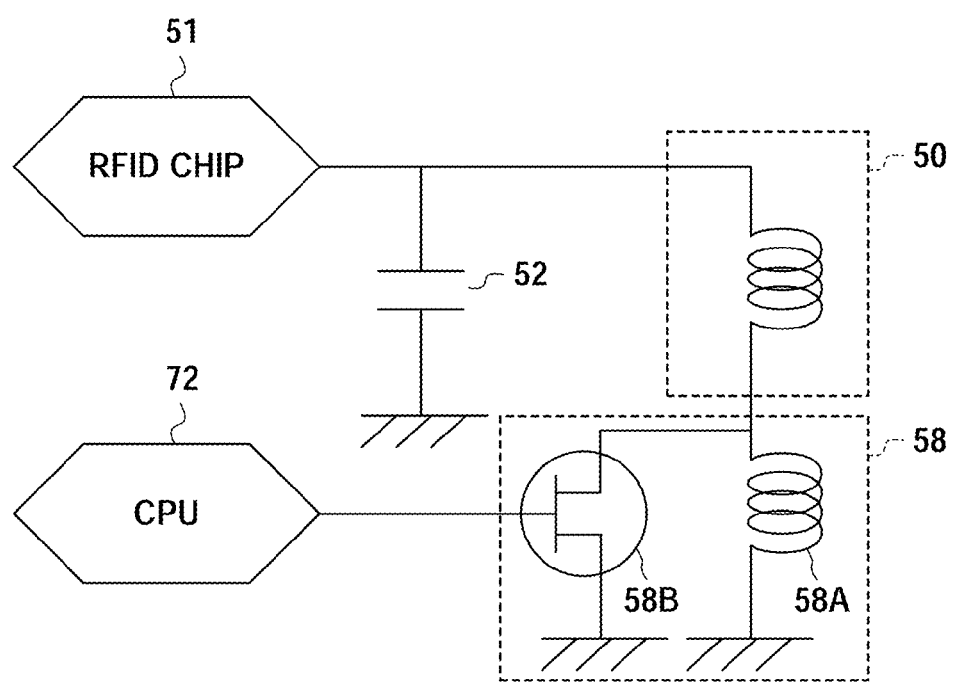
FIG. 34 is a block diagram showing a first configuration of the inductance portion.

As shown in FIG. 34, the inductance portion 58 is serially connected to another end side of the magnetic field antenna portion 50, and includes a first coil 58A for adjustment and a first switch portion 58B.

The first switch portion 58B is configured with, for example, an FET (Field Effect Transistor), and is connected to one end side of the first coil 58A, the side being the another end of the magnetic field antenna portion 50, and switches grounding or ungrounding of the magnetic field antenna portion 50 in accordance with control by the CPU 72.

According to the present invention, for example, before factory shipment, the antenna performance of the RFID portion 41 is confirmed, and the first switch portion 58B is switched to the ON state or the OFF state by the CPU 72, thereby making it possible to easily adjust the resonance frequency.

Here, behavior of the CPU 72 is described hereinafter.

In a case in which the resonance frequency is adjusted by the first coil 58A, the CPU 72 switches the first switch portion 58B to the OFF state such that the magnetic field antenna portion 50 is ungrounded. In this way, by switching the first switch portion 58B to the OFF state, the magnetic field antenna portion 50 and the first coil 58A are electrically connected (conductive).

Moreover, in a case in which the resonance frequency is not adjusted by the first coil 58A, the CPU 72 switches the first switch portion 58B to the ON state such that the magnetic field antenna portion 50 is grounded. In this way, by switching the first switch portion 58B to the ON state, the magnetic field antenna portion 50 is grounded.

Accordingly, in the RFID portion 41, in a case in which the first switch portion 58B is switched to the OFF state, an electric current flows to the first coil 58A, and the resonance frequency is changed in accordance with the inductance of the first coil 58A. Moreover, in the RFID portion 41, in a case in which the first switch portion 58B is switched to the ON state, an electric current does not flow to the first coil 58A, and the inductance of the first coil 58A does not contribute to the resonance frequency. Incidentally, inherent ON resistance actually exists in the first switch portion 58B in the ON state. Therefore, in a case in which the first switch portion 58B is in the ON state, and the impedance of the first coil 58A is small, an electric current flows in proportion to the impedance of the first coil 58A and the first switch portion 58B, even though the magnetic field antenna portion 50 is grounded. Therefore, according to the ON state or the OFF state of the first switch portion 58B, the inductance may fluctuate, and the resonance frequency may be changed in some cases.

Here, if the impedance of the first coil 58A is sufficiently greater than the ON resistance of the first switch portion 58B in the ON state, it is possible to substantially prevent an electric current from flowing to the first coil 58A when the first switch portion 58B is in the ON state, and the ON resistance of the first switch portion 58B can be ignored.

Here, when it is assumed that a voltage that is input to the RFID portion 41 is V1, inductance of the magnetic field antenna portion 50 is L1, and inductance of the first coil 58A is L2, a voltage V2 applied to the drain terminal of the first switch portion 58B is (L1/(L1+L2))*V1.

According to the present invention, the voltage applied to the first switch portion 58B can be set lower than that in a case of a method of dividing a voltage by a capacitor provided to each adjustment step and by OFF state capacitance of a switch portion. Accordingly, the parasitic drain-source diode of the first switch portion 58B can also be adjusted without being rectified, and the waveform quality of input signals is not affected either. Moreover, problems such as a case in which the variable amount is limited by the OFF state capacitance of the first switch portion 58B do not arise either.

In addition, the cellular telephone device 1 may have a temperature sensor and a memory unit, although they are not illustrated. The temperature sensor detects environmental temperature, and transmits the detected temperature to the CPU 72. Furthermore, the memory unit stores a table for switching the ON state and the OFF state of the first switch portion 58B in response to the environmental temperature change.

The CPU 72 refers to the table stored in the memory unit based on the detected temperature transmitted from the temperature sensor, determines the ON state or the OFF state of the first switch portion 58B, and applies a predetermined voltage to the first switch portion 58B. The first switch portion 58B switches between the ON state and the OFF state depending on a voltage value applied by the CPU 72.

With such a configuration, the first switch portion 58B can be switched depending on the user's environment of the cellular telephone device 1 after factory shipment, and the resonance frequency can be adaptively adjusted.

In addition, as for the RFID portion 41, in a case in which the resonance frequency is adjusted, since the voltage applied to the first switch portion 58B (the voltage applied to the first coil 58A) is low, the amount of change of the inductance may be reduced and the resonance frequency may be reduced depending on the inductance of the first coil 58A, between a case in which the first coil 58A is put into an inactive state by switching the first switch portion 58B to the ON state, and a case in which the first coil 58A is put into an active state by switching the first switch portion 58B to the OFF state.

Figure 35:
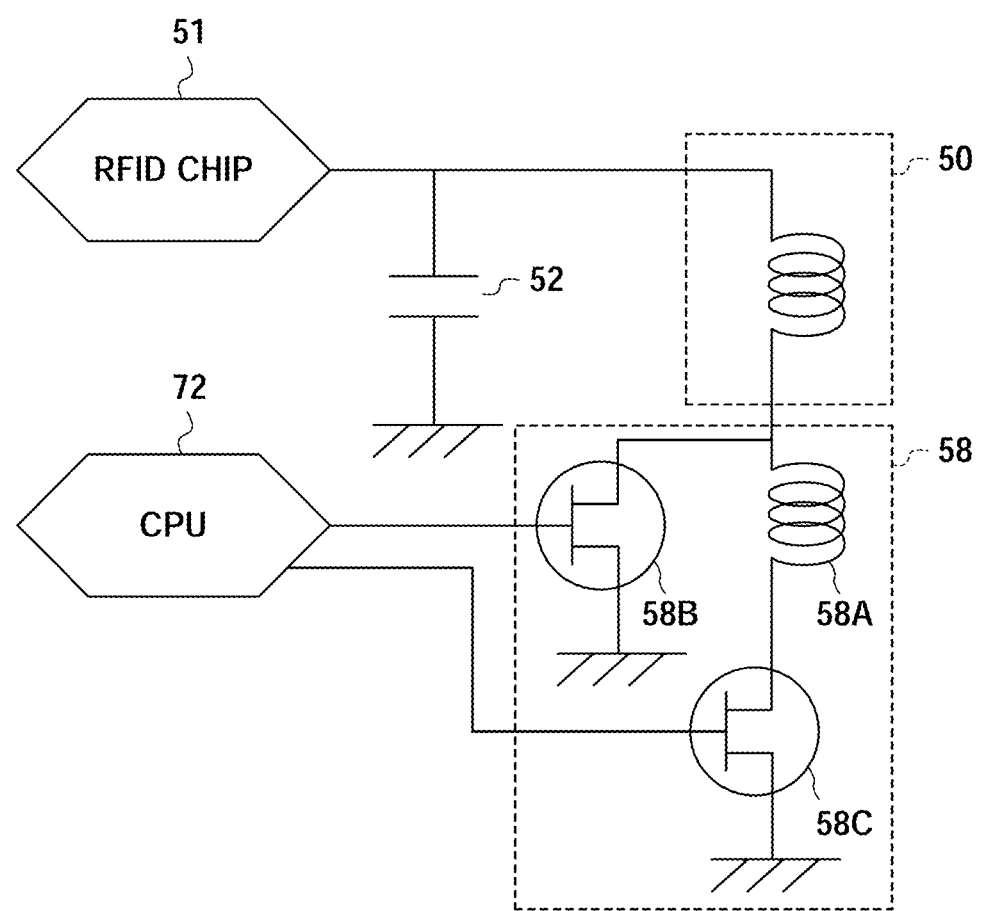
FIG. 35 is a block diagram showing a second configuration of the inductance portion.

In such a case, a configuration is employed in which a second switch portion 58C is connected to the output side of the first coil 58A, and the second switch portion 58C switches the grounding or ungrounding of the first coil 58A (FIG. 35).

Here, specific behavior of the CPU 72 is described hereinafter.

In a case in which the resonance frequency is adjusted by the first coil 58A, the CPU 72 switches the first switch portion 58B to the OFF state, and switches the second switch portion 58C to the ON state, such that the magnetic field antenna portion 50 is ungrounded. In this way, by switching the first switch portion 58B to the OFF state, the magnetic field antenna portion 50 and the first coil 58A are electrically connected (conductive).

Moreover, in a case in which the resonance frequency is not adjusted by the first coil 58A, the CPU 72 switches the first switch portion 58B to the ON state, and switches the second switch portion 58C to the OFF state, such that the magnetic field antenna portion 50 is grounded. In this way, by switching the first switch portion 58B to the ON state, the magnetic field antenna portion 50 is grounded.

With such a configuration, the amount of change of the inductance can be significantly changed and the amount of change of the resonance frequency can be significantly changed, between a case in which the first coil 58A is put into the inactive state by switching the first switch portion 58B to the ON state, and a case in which the first coil 58A is put into the active state by switching the first switch portion 58B to the OFF state. It should be noted that the inductance of the magnetic field antenna portion 50 is, for example, 1.4 µH, and the inductance of the first coil 58A is, for example, several tens of nH. Furthermore, even in a case in which the impedance of the first coil 58A is small, and the ON state resistance of the first switch portion 58B is to an extent that cannot be ignored as compared to the impedance of the first coil 58A, the first coil 58A can be electrically disconnected from the magnetic field antenna portion 50 securely, and therefore ideal adjustment can be performed.

OTHER EMBODIMENTS

In addition, in a case in which the resonance frequency is adjusted through multiple stages, a cellular telephone device 1 is configured in which n coil(s) for adjustment (n is a natural number of at least 1) are connected to a subsequent stage of the first coil 58A, and n switch portion(s) (n is a natural number of at least 1) for switching grounding or ungrounding of each coil are provided thereto.

By controlling the ON state and the OFF state of each switch portion, the CPU 72 changes the number of coils electrically connected (conductive) to the magnetic field antenna portion 50, and changes the total inductance. Moreover, the CPU 72 switches each switch portion to the OFF state and changes the connected coils to be active by applying a first voltage to each switch portion, or changes the connected coils to be inactive by applying a second voltage to each switch portion.

With such a configuration, for example, before factory shipment, the antenna performance of the RFID portion 41 is confirmed, and the state of each switch portion is controlled by the CPU 72, thereby making it possible to precisely determine total inductance, and to perform precise adjustment such that the resonance frequency falls within the specification.

For example, a configuration example in a case in which a second coil 58D is connected to the subsequent stage of the first coil 58A is described hereinafter.

Figure 36:
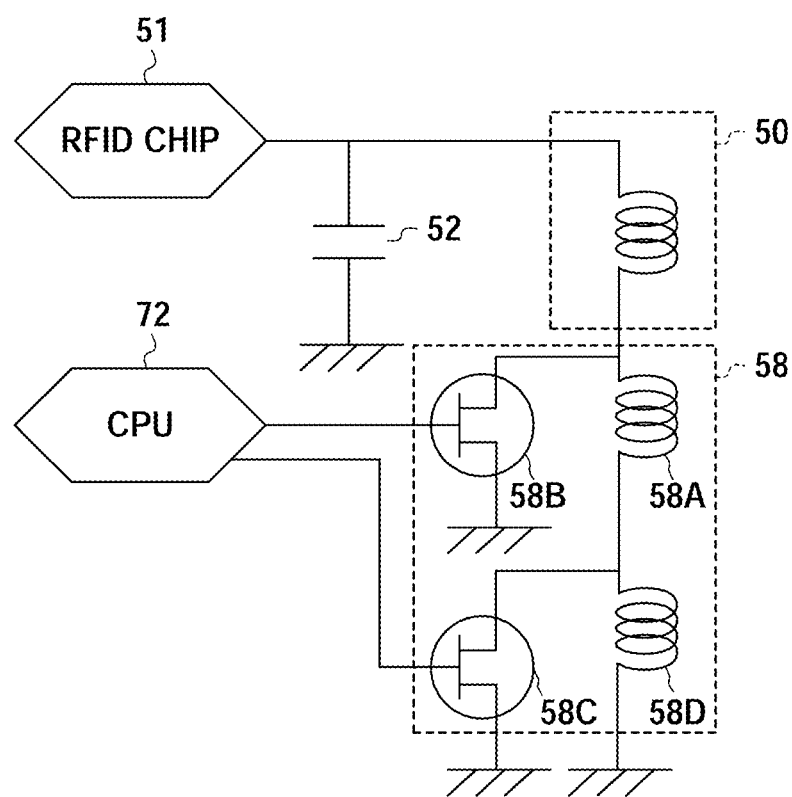
FIG. 36 is a block diagram showing a third configuration of the inductance portion.

As shown in FIG. 36, the inductance portion 58 includes the first coil 58A for adjustment, the first switch portion 58B, the second switch portion 58C, and the second coil 58D for adjustment.

Here, behavior of the CPU 72 is described hereinafter.

In a case in which the resonance frequency is adjusted only by the first coil 58A, the CPU 72 switches the first switch portion 58B to the OFF state, and switches the second switch portion 58C to the ON state, such that the magnetic field antenna portion 50 is ungrounded. In this way, by switching the first switch portion 58B to the OFF state and the second switch portion 58C to the ON state, the magnetic field antenna portion 50 and the first coil 58A are electrically connected (conductive), while the first coil 58A is grounded. Accordingly, in the RFID portion 41, the resonance frequency is determined by the total inductance of the magnetic field antenna portion 50 and the first coil 58A, and the capacitance of the capacitor 52. Incidentally, inherent ON resistance actually exists in the first switch portion 58B and the second switch portion 58C in the ON state. Therefore, in a case in which the first switch portion 58B and the second switch portion 58C are in the ON state, and the impedance of the first coil 58A and the second coil 58D is small, an electric current flows in proportion to the impedance of the first coil 58A and the first switch portion 58B, or the impedance of the first coil 58A, the first switch portion 58B, and the second switch portion 58C, even though the magnetic field antenna portion 50 is grounded. Therefore, according to the ON state or the OFF state of the first switch portion 58B and the second switch portion 58C, the inductance may fluctuate, and the resonance frequency may be changed in some cases.

Here, if the impedance of the first coil 58A and the second coil 58D is sufficiently greater than the ON resistance of the first switch portion 58B and the second switch portion 58C in the ON state, it is possible to substantially prevent an electric current from flowing to the first coil 58A and the second coil 58D when the first switch portion 58B and the second switch portion 58C are in the ON state, and the ON resistance of the first switch portion 58B and the second switch portion 58C can be ignored.

In a case in which the resonance frequency is adjusted by the first coil 58A and the second coil 58D, the CPU 72 switches the first switch portion 58B and the second switch portion to the OFF state such that the magnetic field antenna portion 50 is ungrounded. In this way, by switching the first switch portion 58B and the second switch portion 58C to the OFF state, the magnetic field antenna portion 50, the first coil 58A and the second coil 58D are electrically connected (conductive). Accordingly, in the RFID portion 41, the resonance frequency is determined by the total inductance of the magnetic field antenna portion 50, the first coil 58A and the second coil 58D, as well as the capacitance of the capacitor 52.

Moreover, in a case in which the resonance frequency is not adjusted by the first coil 58A and the second coil 58D, the CPU 72 switches the first switch portion 58B to the ON state such that the magnetic field antenna portion 50 is grounded. In this way, by switching the first switch portion 58B to the ON state, the magnetic field antenna portion 50 is grounded. Accordingly, in the RFID portion 41, the resonance frequency is determined by the inductance of the magnetic field antenna portion 50 and the capacitance of the capacitor 52.

In addition, as for the RFID portion 41, in a case in which the resonance frequency is adjusted, since the voltage applied to the first switch portion 58B and the second switch portion 58C (the voltage applied to the first coil 58A) is low, the amount of change in the total inductance may be reduced and the resonance frequency may be reduced depending on the inductance of the first coil 58A and the second coil 58D, among a case in which the first coil 58A and the second coil 58D are put into the inactive state by switching the first switch portion 58B to the ON state, a case in which the first coil 58A is put into the active state by switching the first switch portion 58B to the OFF state and the second switch portion 58C into the ON state, and a case in which the first coil 58A and the second coil 58D are put into the active state by switching the first switch portion 58B and the second switch portion 58C to the OFF state.

Figure 37:
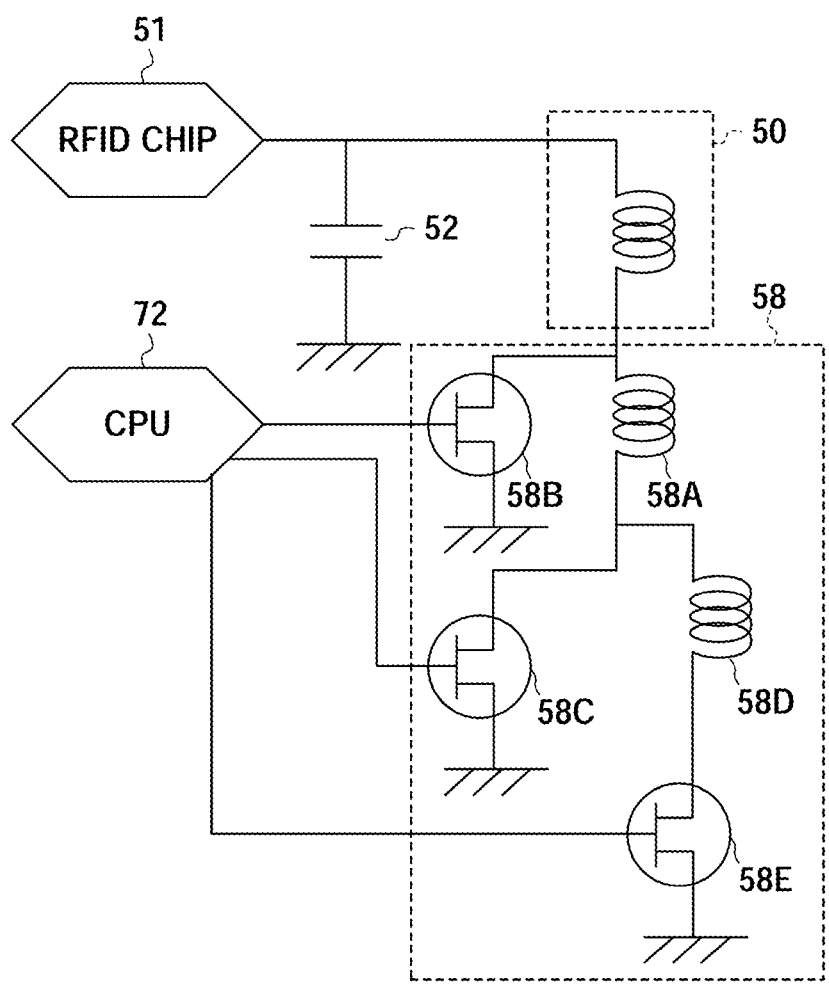
FIG. 37 is a block diagram showing a fourth configuration of the inductance portion.

In such a case, a configuration is employed in which a third switch portion 58E is connected to the output side of the second coil 58D, and the third switch portion 58E switches the grounding or ungrounding of the second coil 58D (FIG. 37).

Here, specific behavior of the CPU 72 is described hereinafter.

In a case in which the resonance frequency is adjusted only by the first coil 53A, the CPU 72 switches the first switch portion 58B to the OFF state, switches the second switch portion 58C to the ON state, and switches the third switch portion 58E to the OFF state, such that the magnetic field antenna portion 50 is ungrounded. In this way, by switching the first switch portion 58B to the OFF state, the second switch portion 58C to the ON state, and the third switch portion 58E to the OFF state, the magnetic field antenna portion 50 and the first coil 58A are electrically connected (conductive), while the first coil 58A is grounded. Accordingly, in the RFID portion 41, the resonance frequency is determined by the total inductance of the magnetic field antenna portion 50 and the first coil 58A, and the capacitance of the capacitor 52.

In a case in which the resonance frequency is adjusted by the first coil 58A and the second coil 58D, the CPU 72 switches the first switch portion 58B and the second switch portion 58C to the OFF state, and the third switch portion 58E to the ON state, such that the magnetic field antenna portion 50 is ungrounded. In this way, by switching the first switch portion 58B and the second switch portion 58C to the OFF state, and the third switch portion 58E to the ON state, the magnetic field antenna portion 50, the first coil 58A and the second coil 58D are electrically connected (conductive). Accordingly, in the RFID portion 41, the resonance frequency is determined by the total inductance of the magnetic field antenna portion 50, the first coil 58A and the second coil 58D, as well as the capacitance of the capacitor 52.

Moreover, in a case in which the resonance frequency is not adjusted by the first coil 58A and the second coil 58D, the CPU 72 switches the first switch portion 58B to the ON state, and switches the second switch portion 58C and the third switch portion 58E to the OFF state, such that the magnetic field antenna portion 50 is grounded. In this way, by switching the first switch portion 58B to the ON state, and by switching the second switch portion 58C and the third switch portion 58E to the OFF state, the magnetic field antenna portion 50 and the first coil 58A are electrically disconnected. Accordingly, in the RFID portion 41, the resonance frequency is determined by the inductance of the magnetic field antenna portion 50 and the capacitance of the capacitor 52.

With such a configuration, the amount of change in the inductance can be significantly changed and the amount of change in the resonance frequency can be significantly changed, among a case in which the first coil 58A and the second coil 58D are put into the inactive state by switching the first switch portion 58B to the ON state and by switching the second switch portion 58C and the third switch portion 58E to the OFF state, a case in which the first coil 58A is put into the active state and the second coil 58D is put into the inactive state by switching the first switch portion 58B and the third switch portion 58E to the OFF state and by switching the second switch portion 58C to the ON state, and a case in which the first coil 58A and the second coil 58D are put into the active state by switching the first switch portion 58B and the second switch portion 58C to the OFF state and by switching the third switch portion 58E to the ON state.

In this way, according to the present invention, the number of coils for adjustment, which are electrically connected to the magnetic field antenna portion 50, is changed by the switching portions, thereby changing the inductance, and making it possible to adjust the resonance frequency; and in a case in which the voltage applied to one coil is low, and the variable width is small, a satisfactory variable width can be obtained by providing switch portions to both ends (input end side and output end side) of the coils for adjustment. Moreover, since the resonance frequency can be made to fall within the specification before and/or after factory shipment, the individual difference (variation) can be absorbed, the yield can be improved, and the manufacturing cost can be reduced.

Furthermore, according to the present invention, it is possible to suppress the voltage applied to the switch portions to be low, as compared to a method of adjusting the resonance frequency by capacitors and switches. Accordingly, it is also possible to adjust the parasitic diodes without rectifying them, and the waveform quality of the input signal becomes satisfactory. In addition, there is no case in which the variable amount is limited by the OFF state capacitance of the switch portions.

Moreover, since the frequency received by the magnetic field antenna portion 50 is low, a coil for adjustment having high impedance cannot be utilized due to its characteristic. Therefore, even if a coil is electrically disconnected by switching the switch portion to the ON state, the resistance value of the switch portion in the ON state approximates the resistance value of the coil for adjustment, a result of which the electric current that is output from the magnetic field antenna portion 50 may flow into both of the switch portion and the coil, and the coil for adjustment may not be electrically disconnected in some cases.

When such a case is assumed, as shown in FIGS. 35 and 37, it is more preferable to configure n+1 switch portions for n coils for adjustment, thereby making it possible to electrically disconnect the coils for adjustment securely. Therefore, according to the present invention, since the coils for adjustment can be used in accordance with theoretical values, the coils for adjustment can be effectively utilized, and the adjustable range can be flexible. In addition, it is also possible to reduce the possibility for waveform distortion to arise in the magnetic field antenna portion 50.

It should be noted that, although the switch portion is described as being configured with an FET in the present embodiment, the switch portion may be configured to enable the switching of grounding/ungrounding of the coils for adjustment, and the switch portion may be, for example, a mechanical switch or the like.

The invention claimed is:

1. A portable electronic device, comprising:
   a first function unit that is capable of executing a predetermined function with electric power being supplied from a battery; and
   a second function unit involving magnetic field communications,
   wherein the second function unit includes:
   an antenna coil that is capable of transmitting and receiving wireless signals by a magnetic field; and
   a reactance adjustment portion that is capable of adjusting a resonance frequency of the antenna coil,
   wherein the reactance adjustment portion includes: a reactance element, an end of which is connected to the antenna coil, the reactance element generating a predetermined resonance frequency; and a temperature-reactance characteristic that is inverse to an inductance characteristic of the antenna coil fluctuating in relation to temperature change.

2. The portable electronic device according to claim 1,
   wherein the first function unit includes a first control unit that is capable of executing the predetermined function, and
   wherein the second function unit includes a second control unit that is capable of obtaining data from wireless signals received by the antenna coil, and transmitting the data to the first control unit.

3. The portable electronic device according to claim 1, wherein a frequency of the wireless signals transmitted and received by the antenna coil is 13.56 MHz.

4. The portable electronic device according to claim 1, wherein the reactance element has a temperature-reactance characteristic that is inverse to the inductance characteristic of the antenna coil within a predetermined temperature range.

5. The portable electronic device according to claim 1,
   wherein the antenna coil includes an antenna assembly together with another electronic component,
   wherein the second function unit has a first control unit for obtaining data to be received by the antenna assembly, and
   wherein the reactance adjustment portion is disposed between the antenna assembly and the first control unit, and changes the resonance frequency of the antenna coil by changing a reactance value.

6. The portable electronic device according to claim 5, wherein the reactance adjustment portion is a varicap diode.

7. The portable electronic device according to claim 5,
   wherein the first function unit includes a second control unit that is capable of executing the predetermined function, and
   wherein the first control unit obtains data from a received wave received by the antenna coil, and transmits the data thus obtained to the second control unit.

8. The portable electronic device according to claim 7,
   wherein the reactance adjustment portion includes a reactance element and a switching element that is capable of switching of the reactance element between active and inactive, and
   wherein the switching element is controlled by the second control unit.

9. The portable electronic device according to claim 7, wherein the switching element is an FET (Field Effect Transistor), to which a bias voltage is applied so that a parasitic diode included in the FET is not rectified.

10. The portable electronic device according to claim 7,
    wherein the reactance adjustment portion includes a plurality of pairs each configured with a reactance element and a switching element that is capable of switching of the reactance element between active and inactive, and
    wherein the second control unit changes the reactance value by switching each of the plurality of switching elements.

11. The portable electronic device according to claim 7,
    further comprising a temperature detecting element,
    wherein the second control unit controls such that the reactance value of the reactance adjustment portion is changed in response to a detected result of the temperature detecting element.

12. The portable electronic device according to claim 5, wherein a frequency of the wireless signals transmitted and received by the antenna coil is 13.56 MHz.

13. A magnetic field antenna circuit, which is incorporated into a portable electronic device including a first function unit that is capable of executing a predetermined function with electric power being supplied from a battery, and which constitutes a part of a second function unit involving magnetic field communications, the magnetic field antenna circuit comprising:

an antenna coil that is capable of transmitting and receiving wireless signals by a magnetic field; and a reactance element, an end of which is connected to the antenna coil, the reactance element generating a predetermined resonance frequency, wherein the reactance element has a temperature-reactance characteristic that is inverse to the inductance characteristic of the antenna coil fluctuating in relation to temperature change.

14. A magnetic field antenna circuit, which is incorporated into a portable electronic device including a first function unit that is capable of executing a predetermined function with electric power being supplied from a battery, and which constitutes a part of a second function unit involving magnetic field communications, the magnetic field antenna circuit comprising:

an antenna coil that is capable of transmitting and receiving wireless signals by a magnetic field; and a reactance adjustment portion, an end of which is connected to the antenna coil, the reactance adjustment portion generating a resonance frequency, wherein the reactance adjustment portion is capable of changing a reactance value and wherein the reactance adjustment portion includes: a reactance element, an end of which is connected to the antenna coil, the reactance element generating a predetermined resonance frequency; and a temperature-reactance characteristic that is inverse to an inductance characteristic of the antenna coil fluctuating in relation to temperature change.

15. A portable electronic device, comprising:

an antenna that is capable of receiving wireless signals from a magnetic field;

a capacitor connected in parallel to one end side of the antenna;

a first inductance portion serially connected to another end side of the antenna;

a first switch portion, which is connected to one end side of the first inductance portion, the side being the another end side of the antenna, and which switches grounding or ungrounding of the antenna;

a second switch portion, which is connected to a side opposite to the antenna of the first inductance portion, and which switches grounding or ungrounding of the first inductance portion; and a control unit for controlling switching operation of the first switch portion and the second switch portion, wherein the control unit switches the first switch portion such that the antenna is ungrounded, and switches the second switch portion such that the first inductance portion is grounded, thereby electrically connecting the antenna and the first inductance portion; and the control unit switches the first switch portion such that the antenna is grounded, and switches the second switch portion such that the first inductance portion is ungrounded, thereby electrically disconnecting the antenna and the first inductance portion.

16. The portable electronic device according to claim 15, comprising:

a second inductance portion serially connected to another end side of the first inductance portion; and a third switch portion, which is connected to the second inductance portion, and which switches grounding or ungrounding of the second inductance portion, wherein the second inductance portion includes n inductance elements (n is a natural number of at least 1), wherein the third switch portion includes n switch portions, and wherein the control unit controls switching operation of each switch portion configuring the third switch portion.

\* \* \* \* \*